US005875427A

United States Patent [19]

Yamazaki

[11] Patent Number: 5,875,427

[45] Date of Patent: Feb. 23, 1999

[54] VOICE-GENERATING/DOCUMENT MAKING APPARATUS VOICE-GENERATING/ DOCUMENT MAKING METHOD AND COMPUTER-READABLE MEDIUM FOR STORING THEREIN A PROGRAM HAVING A COMPUTER EXECUTE VOICE-GENERATING/DOCUMENT MAKING SEQUENCE

[75] Inventor: Nobuhide Yamazaki, Yokohama, Japan

[73] Assignee: Justsystem Corp., Tokushima, Japan

[21] Appl. No.: 828,942

[22] Filed: Mar. 28, 1997

[30] Foreign Application Priority Data

Dec. 4, 1996 [JP] Japan .................................... 8-324459

[51] Int. Cl.$^{6}$ ........................................................ G01L 5/02

[52] U.S. Cl. .......................... 704/258; 704/270; 704/276; 704/278

[58] Field of Search .................................... 704/258, 270, 704/276, 278

[56] References Cited

U.S. PATENT DOCUMENTS

| | | | |
|---|---|---|---|
| 4,764,965 | 8/1988 | Yoshimura et al. | 381/43 |
| 4,912,768 | 3/1990 | Benbassat | 381/52 |
| 4,975,957 | 12/1990 | Ichikawa et al. | 381/36 |
| 5,111,409 | 5/1992 | Gasper et al. | 395/152 |
| 5,220,611 | 6/1993 | Nakamura et al. | 381/48 |
| 5,287,443 | 2/1994 | Mameda et al. | 395/146 |
| 5,581,752 | 12/1996 | Inoue et al. | 395/601 |
| 5,590,317 | 12/1996 | Iguchi et al. | 395/602 |
| 5,630,017 | 5/1997 | Gasper et al. | 395/2.85 |
| 5,652,828 | 7/1997 | Silverman | 395/2.69 |
| 5,689,618 | 11/1997 | Gasper et al. | 395/2.85 |
| 5,751,906 | 5/1998 | Silverman | 395/2.69 |

FOREIGN PATENT DOCUMENTS

| | | |
|---|---|---|
| 60-102697 | 6/1985 | Japan . |
| 60-216395 | 10/1985 | Japan . |
| 61-87199 | 5/1986 | Japan . |
| 62-284398 | 12/1987 | Japan . |
| 63-191454 | 8/1988 | Japan . |
| 63-262699 | 10/1988 | Japan . |
| 2-58100 | 2/1990 | Japan . |
| 2-84700 | 3/1990 | Japan . |
| 3-160500 | 7/1991 | Japan . |
| 5-52520 | 8/1993 | Japan . |
| 5-232992 | 9/1993 | Japan . |
| 5-281984 | 10/1993 | Japan . |

*Primary Examiner*—David R. Hudspeth
*Assistant Examiner*—Michael N. Opsasnick
*Attorney, Agent, or Firm*—Sughrue, Mion, Zinn, Macpeak & Seas, PLLC

[57] ABSTRACT

A voice-generating information making apparatus comprises: a talking way data storing section for storing therein talking way data comprising character string information grouped according to the character string information, a character string input unit for inputting a character string (consisting of a control section, an application storing section, a key entry section, and a display section), a retrieving unit for retrieving a group having the same character string information as the inputted character string, a voice tone data storing section for storing therein a plurality of voice tone data, a voice synthesizing section for synthesizing a voice, a voice selecting unit for selecting a desired voice from the synthesized voice, and a voice-generating document storing section for storing therein talking way data corresponding to the selected voice as a voice-generating document in correlation to the inputted character string.

54 Claims, 29 Drawing Sheets

201

| CHARACTER STRING INFORMATION (202) | PHONEME STRING INFORMATION (203) | DURATION LENGTH (204) | PITCH INFORMATION (205) | VELOCITY INFORMATION (206) | TYPE INFORMATION (207) |
|---|---|---|---|---|---|
| *KONNICHIWA* | (KO,N,NI,CHI,WA) | (T11,T12,T13,T14,T15) | (P11, ······,P1n) | (V11,V12,V13,V14,V15) | TYPE 1 |
| | (KO,N,NI,CHI,WA) | (T21,T22,T23,T24,T25) | (P21, ······,P2n) | (V21,V22,V23,V24,V25) | TYPE 2 |
| | (KO,N,NI,CHI,WA) | (T31,T32,T33,T34,T35) | (P31, ······,P3n) | (V31,V32,V33,V34,V35) | TYPE 3 |
| *KONNICHIWA OR KYOUWA* | (KO,N,NI,CHI,WA) | (T11,T12,T13,T14,T15) | (P11, ······,P1n) | (V11,V12,V13,V14,V15) | TYPE 1 |
| | (KO,N,NI,CHI,WA) | (T21,T22,T23,T24,T25) | (P21, ······,P2n) | (V21,V22,V23,V24,V25) | TYPE 2 |
| | (KO,N,NI,CHI,WA) | (T31,T32,T33,T34,T35) | (P31, ······,P3n) | (V31,V32,V33,V34,V35) | TYPE 3 |
| | (KY0,U,WA) | (T41,T42,T43) | (P41, ······,P4n) | (V41,V42,V43) | TYPE 1 |
| | (KY0,U,WA) | (T51,T52,T53) | (P51, ······,P5n) | (V51,V52,V53) | TYPE 2 |
| *SAYOUNARA* | (SA,YO,U,NA,RA) | (T61,T62,T63,T64,T65) | (P61, ······,P6n) | (V61,V62,V63,V64,V65) | TYPE 1 |
| | (SA,YO,U,NA,RA) | (T71,T72,T73,T74,T75) | (P71, ······,P7n) | (V71,V72,V73,V74,V75) | TYPE 2 |

FIG. 2

| SELECTION NO. | VOICE TONE DATA |
|---|---|
| 1 | MALE'S VOICE |
| 2 | FEMALE'S VOICE |
| 3 | CHILD'S VOICE |
| 4 | OLD PERSON'S VOICE |
| 5 | HUSKY VOICE |
| 6 | CLEAR VIOCE |
| 7 | DEEP VOICE |
| 8 | THIN VOICE |
| 9 | STRONG VOICE |
| 10 | GENTLE VOICE |
| 11 | MECHANICAL VOICE |
| ⋮ | ⋮ |

FIG. 3

| | CHARACTER STRING INFORMATION (202) | PHONEME STRING INFORMATION (203) | DURATION LENGTH (204) | PITCH INFORMATION (205) | VELOCITY INFORMATION (206) | VOICE TONE (VOICE TONE DATA) SELECTION NO. | |
|---|---|---|---|---|---|---|---|
| 901 | *KONNICHIWA* | (KO,N,NI,CHI,WA) | (T11,T12,T13,T14,T15) | (P11, ······,P1n) | (V11,V12,V13,V14,V15) | 2 | (FEMALE'S VOICE) |
| | *ICHITAROUSAN* | (I,CHI,TA,RO,U,SA,N) | (T81,T82,T83,T84,T85,T86,T87) | (P21, ······,P2n) | (V81,V82,V83,V84,V85,V86,V87) | 2 | (FEMALE'S VOICE) |
| | *TOIU* | (TO,I,U) | (T91,T92,T93) | (P31, ······,P3n) | (V91,V92,V93) | 1 | (MALE'S VOICE) |
| | ≈ | ≈ | ≈ | ≈ | ≈ | ≈ | |
| 902 | *KYOUWA* | (KYO,U,WA) | (T41,T42,T43) | (P41, ······,P4n) | (V41,V42,V43) | 1 | (MALE'S VOICE) |
| | | | | | | | |

FIG. 9

VOICE-GENERATING/DOCUMENT MAKING APPARATUS VOICE-GENERATING/ DOCUMENT MAKING METHOD AND COMPUTER-READABLE MEDIUM FOR STORING THEREIN A PROGRAM HAVING A COMPUTER EXECUTE VOICE-GENERATING/DOCUMENT MAKING SEQUENCE

FIELD OF THE INVENTION

The present invention relates to a voice-generating document making apparatus for generating a voice-generating document by adding "talking way" data, identifying a talking way for a character string, to character strings that constitute the document. It also relates to a voice-generating/ document making method, and a computer-readable medium in which is stored a program for having a computer execute a voice-generating/document making sequence.

BACKGROUND OF THE INVENTION

Character information is used as a basis for one of the conventional methods for delivering and storing information. In recent years, a person who wishes to generate a desired document will use a document making apparatus such as a Japanese language word processor, or an English language word processor, or a personal computer having a function as word processor. The prepared document can be transferred through a network, or stored in a storage medium such as a magnetic disk or an optical disk. This practice has become very popular because highly sophisticated document making apparatus has been realized with low cost. A further basis for such popularity is the change in the working environment, such as the tendency for a paperless environment in offices, the consolidation of communication networks, and the popularization of electronic mail.

Also, as other methods of delivering and storing information, there has been known a method of using voice information, or a method of using voice information together with image information. For instance, in the method of using voice information, information delivery is executed by directly transferring the voice information through a telephone line or the like, while information storage is executed by using a recorder and recording the voice information in a tape or the like. Also, in the method of using voice information together with image information, information delivery is executed by transferring the voice information and image information with a communication device having a monitor and a speaker, while information storage is executed by using a recording device such as a video device and storing the information in a video tape, optical disk, or the like.

Of the methods for delivering and storing information described above, the method of using character information needs a smaller quantity of data and is easier in editing information as compared to other methods. Further, the character information can be used as digital information on a computer system, so that the range of its availability for various applications is quite broad.

However, in the method of using the character information based on the conventional technology, information in a prepared document is limited to visual language information (namely, character language information), so that emotions or the like, which is non-language information, cannot be added as information thereto. It should be noted that, in a case of language information using a voice (namely, voice language information), emotional expressions which are non-language information can be added as information by changing a "talking way" such as the accent, velocity or pitch of a voice or the like.

Also, the conventional technology did not provide an apparatus for or a method of making information in which two types of information, each having a different expression form respectively, namely character information and voice information, are combined with consistency.

Also, voice information is generally edited by using the auditory sense (namely by hearing a reproduced voice with the ears). Thus, it is necessary to check a position of desired voice information by reproducing each information. As a result, such effort is disadvantageously complicated and troublesome.

It should be noted that, although a voice can be synthesized from a text document (namely, character information) by using the text voice synthesizing technology, which is one of the conventional types of voice synthesizing technologies, there are some problems such as misreading a proper name not listed in the dictionary or pronouncing the proper name with the wrong accent. Further, there are problems such that emotion or the like, which comprises non-language information, cannot be expressed, or that a voice cannot accurately be synthesized with a talking way intended by a person who makes a document.

SUMMARY OF THE INVENTION

It is an object of the present invention to provide an apparatus for and a method of making information (voice-generating document) in which two types of information, each having a different expression form respectively, namely character information and voice information, are combined with consistency.

It is another object of the present invention to enable the addition of expression of emotion or the like, which is non-language information, to a document by making information in which character information and voice information (talking way data), including data for a talking way intended by the person who makes the document, are combined with consistency.

It is another object of the present invention to improve workability by visually editing voice information through character information, as well as to enable accurate synthesis of a voice with a talking way, as intended by the person who makes the document.

Other objects and features of this invention will become understood from the following description with reference to the accompanying drawings.

BRIEF DESCRIPTION OF THE DRAWINGS

FIG. 2 is an explanatory view showing talking way data stored in a talking way data storing section according to Embodiment 1;

FIG. 3 is an explanatory view showing types of voice tone data stored in a voice tone data storing section according to Embodiment 1;

FIG. 9 is an explanatory view showing an example of voice-generating document data stored in the voice-generating document storing section;

FIGS. 13A and 13B are explanatory views showing another example of a display screen in a display section in the processing for regenerating a voice-generating document;

DESCRIPTION OF THE PREFERRED EMBODIMENTS

Detailed description is made hereinafter for a voice-generating/document making apparatus, a voice-generating/document making method, and a computer-readable medium for storing therein a program enabling a computer to execute a sequence for making the voice-generating document each according to the present invention with reference to the related drawings in the order of the first embodiment and second embodiment.

Figure 1:
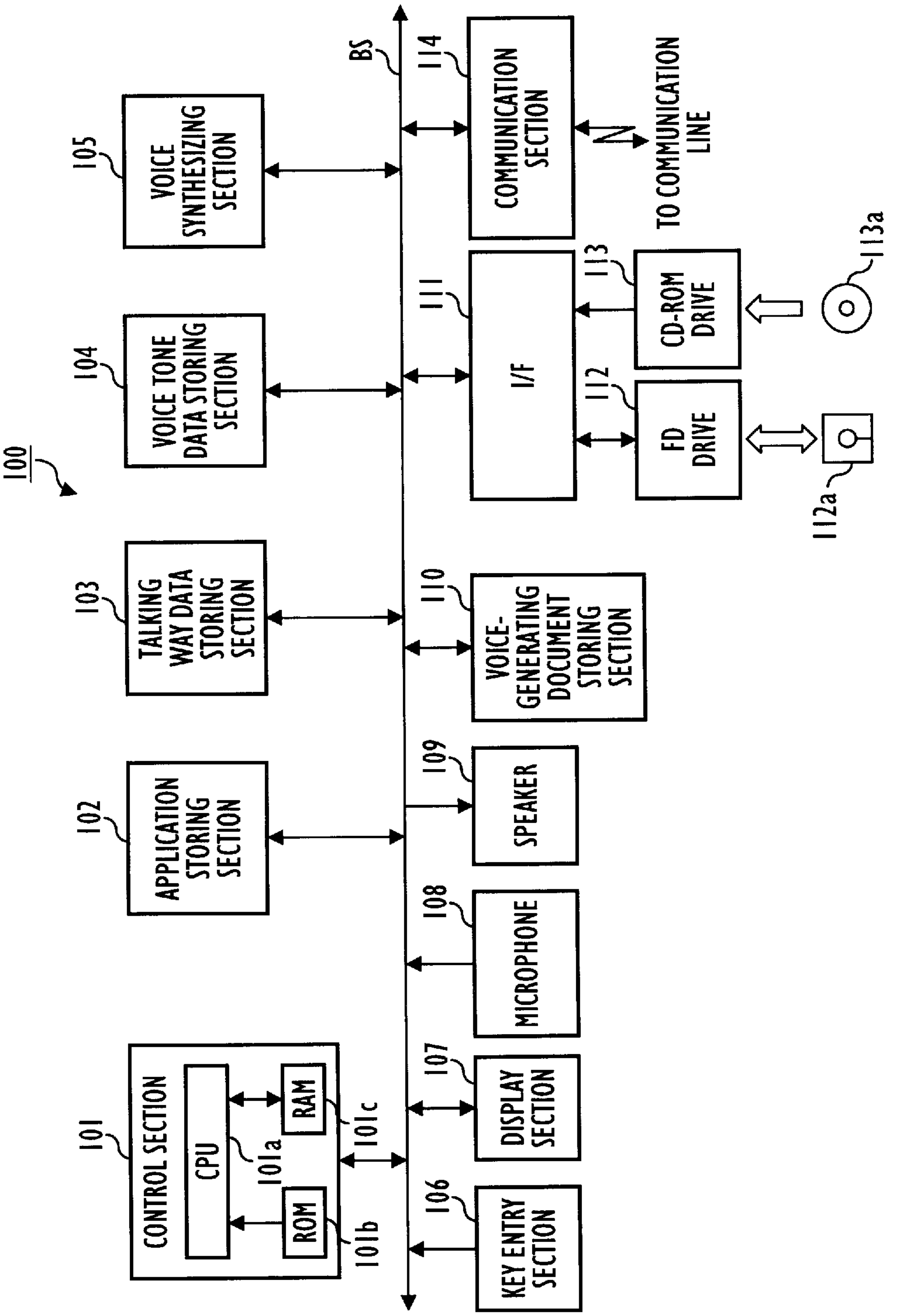
FIG. 1 is a block diagram showing outline of a voice-generating document making apparatus according to Embodiment 1.

FIG. 1 shows a schematic block diagram of a voice-generating document making apparatus 100 according to first embodiment. This voice-generating document making apparatus 100 comprises a control section 101, an application storing section 102, a talking way data storing section 103, a voice tone data storing section 104, a voice synthesizing section 105, a key entry section 106, a display section 107, a microphone 108, a speaker 109, a voice-generating document storing section 110, an interface (I/F) 111, a floppy disk drive (FD drive) 112, a CD-ROM drive 113, and a communication section 114.

The control section 101 is a central processing unit for controlling each of the units coupled to a bus BS, and comprises a CPU 101*a*, a ROM 101*b*, and a RAM 101*c*. The CPU 101*a* operates according to an OS (operating system) program stored in the ROM 101*b* as well as to an application program stored in the application storing section 102. The ROM 101*b* is a memory used for storing the OS program, and the RAM 101*c* is a memory used as a work area for various types of program.

Stored in the application storing section 102 are various types of applications such as a program for making a voice-generating document, a program for regenerating a voice-generating document, and a program for making/registering talking way data or the like, each described later. The voice-generating document making apparatus 100 according to Embodiment 1 has a kana (Japanese character)—kanji (Chinese character) converting function. An application for conversion between kana and kanji for realizing this kana-kanji converting function is also stored in the application storing section 102.

The talking way data storing section 103 plays a role of the talking way data storing means according to the present invention. As shown in FIG. 2, talking way data 201 is grouped by the character string information 202, which is one of the types of information included in the talking way data 201, and is stored in section 103 so that information can be retrieved group-by-group using the character string information 202.

It should be noted that the talking way data 201 comprises: (1) the character string information 202 consisting of words, clauses, or sentences; (2) phoneme string information

203 consisting of phonemes, each corresponding to a character in the character string information 202, and a duration length 204 for each phoneme in the phoneme string information 203; (3) pitch information 205 for specifying a relative pitch at an arbitrary point of time in the phoneme string information 203; (4) velocity information 206 for specifying a volume of each phoneme in the phoneme string information 203; and (5) type information 207 for indicating a classified type of each talking way data. Although a detailed description is omitted herein, it is also possible to retrieve desired talking way data 201 according to information other than the character string information 202 (e.g., phoneme string information 203 and type information 207) as a key for retrieval.

When a group of the character string information 202 indicating "konnichiwa" (consisting of five Japanese characters, which means "Good afternoon", and described as "konnichiwa (A)" hereinafter) is retrieved herein, three types of talking way data 201 comprising the phoneme string information of "ko, n, ni, chi, wa" in the phoneme string information 203 can be obtained. Although the character string information 202 and the phoneme string information 203 are common in the obtained talking way data 201, each of the talking way data 201 can be discriminated from the others because any of the duration length 204, pitch information 205, and velocity information 206 is different from that in other strings.

Also, when a group of the character string information 202 indicating, for instance, "Konnichiwa" (consisting of two Chinese characters and one Japanese character, which means "Good afternoon" and there is another meaning in another pronunciation described below, and described as "konnichiwa (B)" hereinafter) is retrieved, talking way data 201 including three types of phoneme string information 203 of "ko, n, ni, chi, wa" and two types phoneme string information 203 of "kyo, u, wa", five types in total, can be obtained. The obtained talking way data 201 can first be divided into two types according to the phoneme string information 203, and further can be discriminated as different talking way data 201, respectively, because any of the duration length 204, pitch information 205, and velocity information 206 is different from that in others.

It should be noted that the three types of talking way data 201 in a group having the character string information 202 of "konniciwa (A)" and three types of talking way data 201 each the phoneme string information of "ko, n, ni, chi, wa" in a group having the character string information 202 of "konnichiwa (B)" are different from each other only in the character string information 202. Other information (phoneme string information 203 to type information 207) are common to each type of talking way data 201. For this reason, in Embodiment 1, the talking way data 201 in the talking way data storing section 103 is shown in a form of an information table as shown in FIG. 2, to simplify description thereof. However, it is obvious that a reduction of the entire information set and an effective use of the memory can be achieved by dividing the talking way data 201 into a section of the character string information 202, a section from the phoneme string information 203 to the velocity information 206, and a section of the type information 207, and then storing the data linking the sections to each other in a form of a database in which the same information is common to each type of talking way data 201.

The voice tone data storing section 104 plays a role in the voice tone data storing means according to the present invention and stores therein a plurality of voice tone data for adding voice tone to a voice to be synthesized. Herein, voice tone data is stored in a form of, for instance, spectrum information to the phoneme system (which is information changing from time to time, and more specifically, the information is expressed by a cepstrum and LSP parameters or the like). And as a plurality of voice tone data, as shown in FIG. 3, voice tone data, each of which can sensuously be identified, respectively, as a male's voice, a female's voice, child's voice, an old person's voice, a husky voice, a clear voice, a deep voice, a thin voice, a strong voice, a gentle voice, and a mechanical voice, is stored therein.

The voice synthesizing section 105, which plays the role of a voice synthesizing means according to the present invention, successively reads out the talking way data 201 in groups that were stored in the talking way data storing section 103 and are retrieved by the control section 101. The voice synthesizing section synthesizes a voice using the phoneme string information 203, duration length 204, pitch information 205, and velocity information 206, each of which is present in the read out talking way data 201, as well as one of the voice tone data stored in the voice tone data storing section 104.

The key entry section 106 has an entry device, such as a key board and a mouse or the like, and is used for executing various types of operations such as the entry of character strings, the selection of a voice, the specification of a regeneration of a voice-generating document, and the preparation or registration of a voice-generating document or the like.

The display section 107 comprises a liquid crystal display unit or a CRT display unit, and is used for displaying thereon character strings, a voice-generating document, and various types of message.

The microphone 108 is used for sampling an original natural voice which is used as original voice waveform data when talking way data 201 is prepared and registered.

The speaker 109 is used for reproducing and outputting a voice, synthesized by the voice synthesizing section 105, and other types of sound.

The voice-generating document storing section 110 is a memory for storing therein a prepared voice-generating document. A voice-generating document, detail of which is described later, is a document prepared by correlating the selected talking way data 201, a selected voice tone number for specifying voice tone data, and the inputted character string through the key entry section 106 to each other.

The I/F 111 is a unit for data transaction between the bus BS and the FD drive 112 or the CD-ROM drive 113. The FD drive 112 reads out data from or writes information in a FD 112*a* (storage medium) detachably set therein. CD-ROM drive 113 reads out information in a CD-ROM 113*a* (storage medium) detachably set therein. It should be noted that a voice-generating document stored in the voice-generating document storing section 110 can also be stored in the FD 112*a* through the I/F 111 and the FD drive 112.

The communication section 114 is connected to a communication line and executes communications with external devices through the communication line.

It should be noted that, in Embodiment 1, the control section 101, key entry section 106, and the display section 107 support the function of the character string input means as well as of the regeneration specifying means, according to the present invention. The control section 101 supports the function of retrieving means according to the present invention, while the speaker 109, key entry section 106, and the control section 101 support the function of the voice selecting means as well as of the voice tone data specifying means according to the present invention. The control section 101 and the voice-generating document storing section 110 support the function of the voice-generating document storing means according to the present invention, and the control section 101, key entry section 106, display section 107, microphone 108, and speaker 109 support the function of the talking way data making/registering means according to the present invention.

Although the description of Embodiment 1 assumes a case where a character string is inputted through the key entry section 106, the present invention is not limited to this case. For example, a handwritten document inputting device may be connected to the apparatus so that handwritten characters are determined (identified) for inputting character strings, and further character strings may be inputted from, for instance, a document prepared by a word processor.

Figure 4:
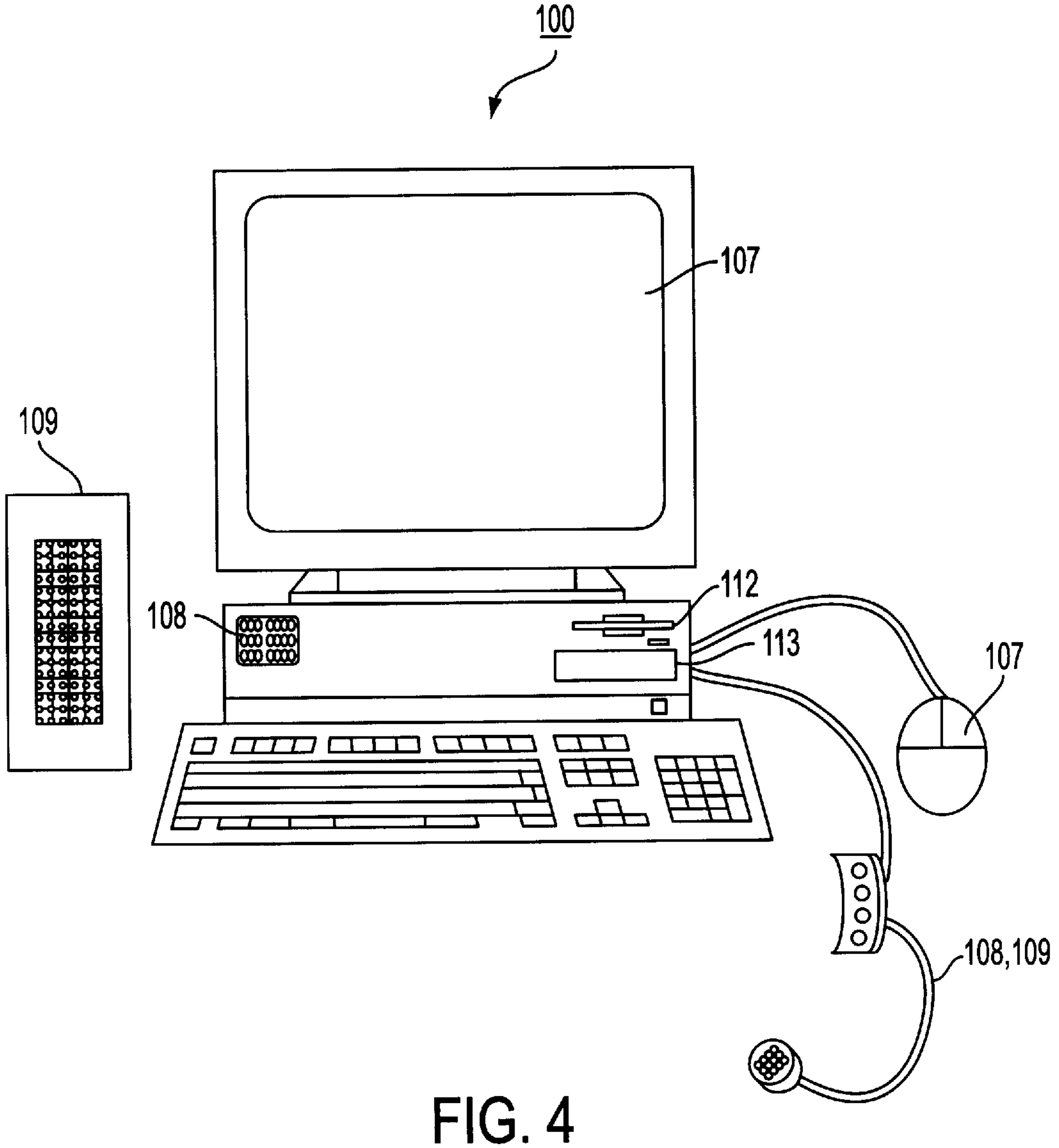
FIG. 4 is a view showing an external appearance of the voice-generating document making apparatus according to Embodiment 1.

FIG. 4 shows a view of the voice-generating document making apparatus 100 according to Embodiment 1. As shown in the figure, a personal computer with a microphone 108 as well as a speaker 109 can be used in the hardware configuration.

Description is made for operations in the configuration described above in the order of the processing as follows:

1) processing for preparing a voice-generating document;
2) processing for regenerating a voice-generating document;
3) processing for preparing a voice-generating document using type information;
4) processing for regenerating a voice-generating document using type information;
5) processing for preparing and registering talking way data; and
6) processing for changing a voice-generating document.

Figure 5:
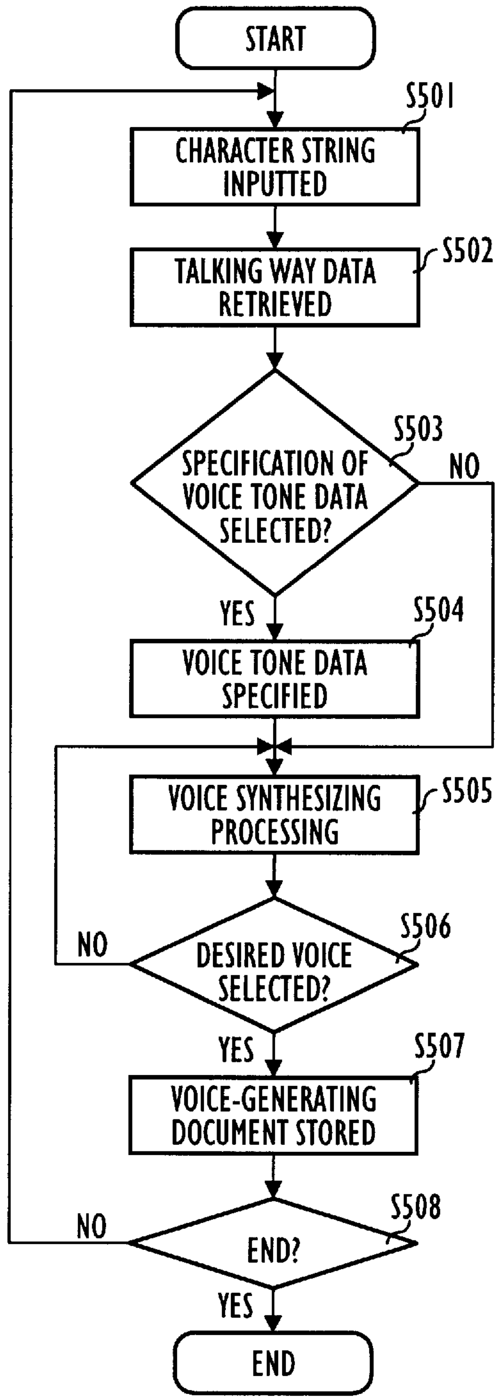
FIG. 5 is a flow chart showing outline of the processing for making a voice-generating document according to Embodiment 1.

1) Description now is made of the processing for making a voice-generating document with reference to FIG. 5 to FIG. 9. Herein, FIG. 5 is a schematic flow chart showing the processing for making a voice-generating document, and FIG. 6 to FIG. 9 show examples of a display screen on the display section 107 in the processing for making a voice-generating document. It should be noted that it is assumed herein that the control section 101 initiates the program for making a voice-generating document stored in the application storing section 102 to execute operations in the schematic flow chart shown in FIG. 5 when power for the main body of the voice-generating document making apparatus 100 is turned on.

Figure 6A:
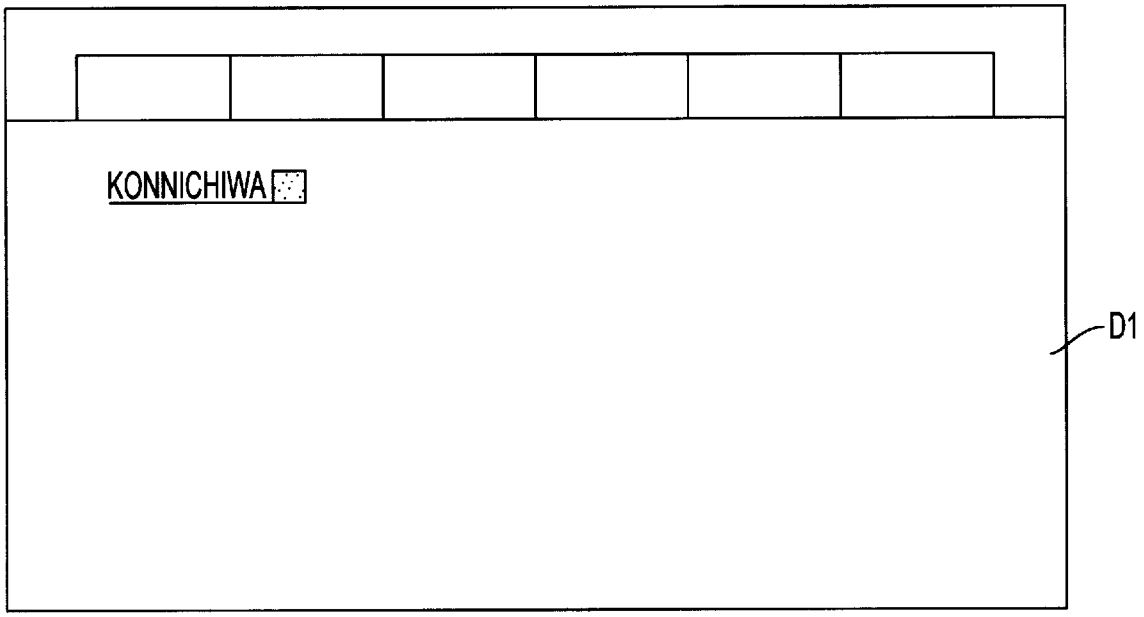
FIGS. 6A and 6B are explanatory views showing an example of a display screen in a display section in the processing for making a voice-generating document.
Figure 6B:
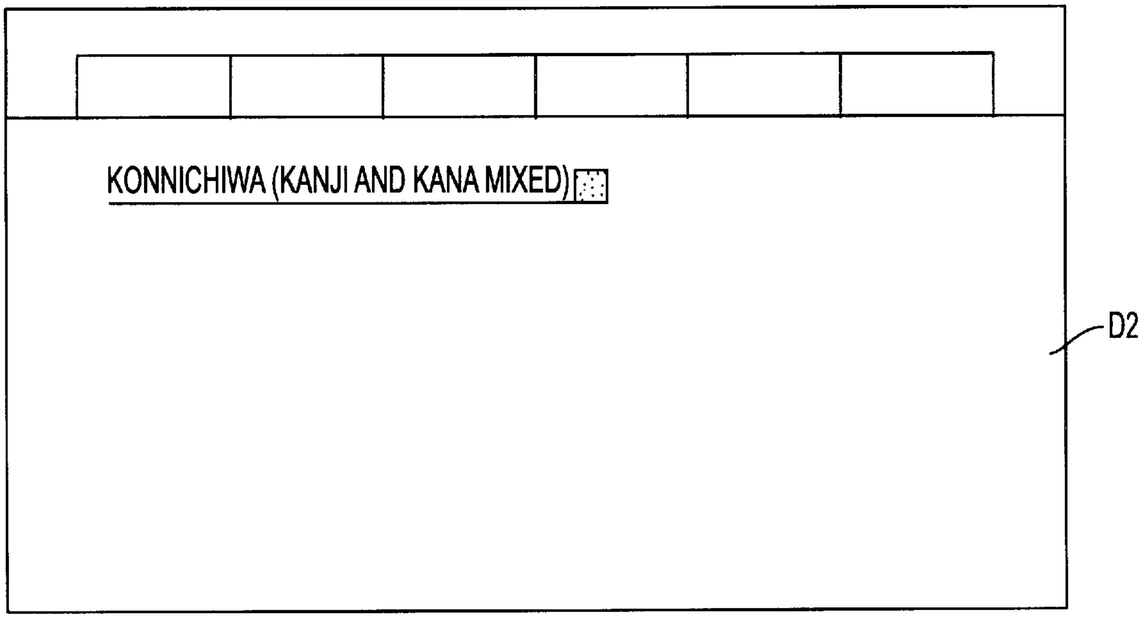
Figure 7A:
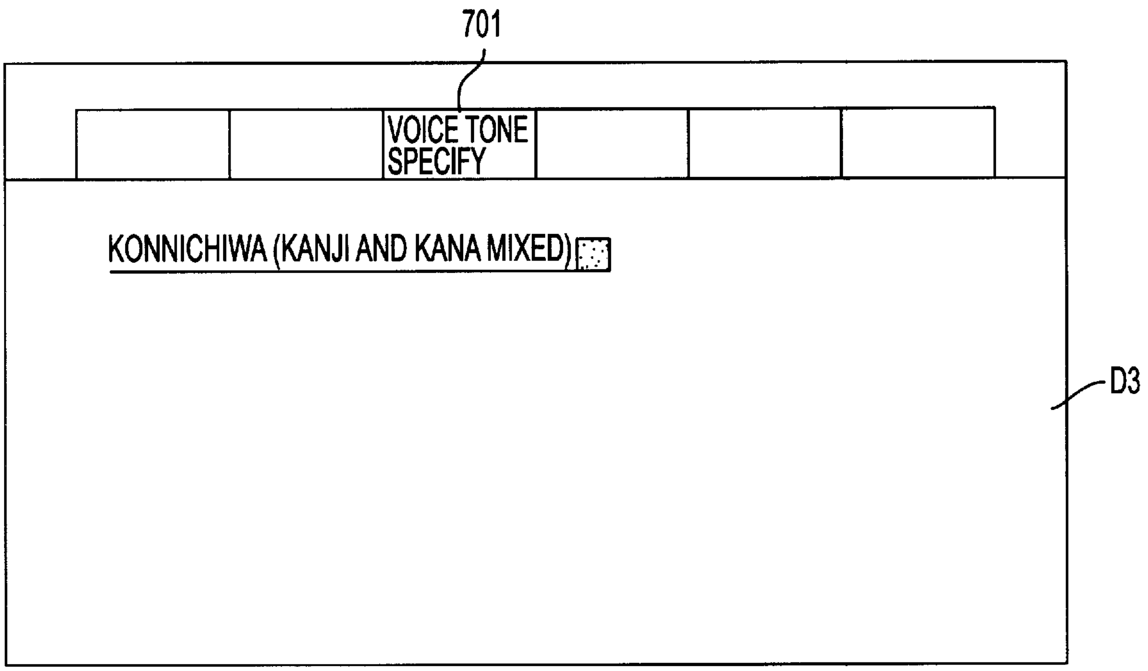
FIGS. 7A and 7B are explanatory views showing another example of a display screen in a display section in the processing for making a voice-generating document.
Figure 7B:
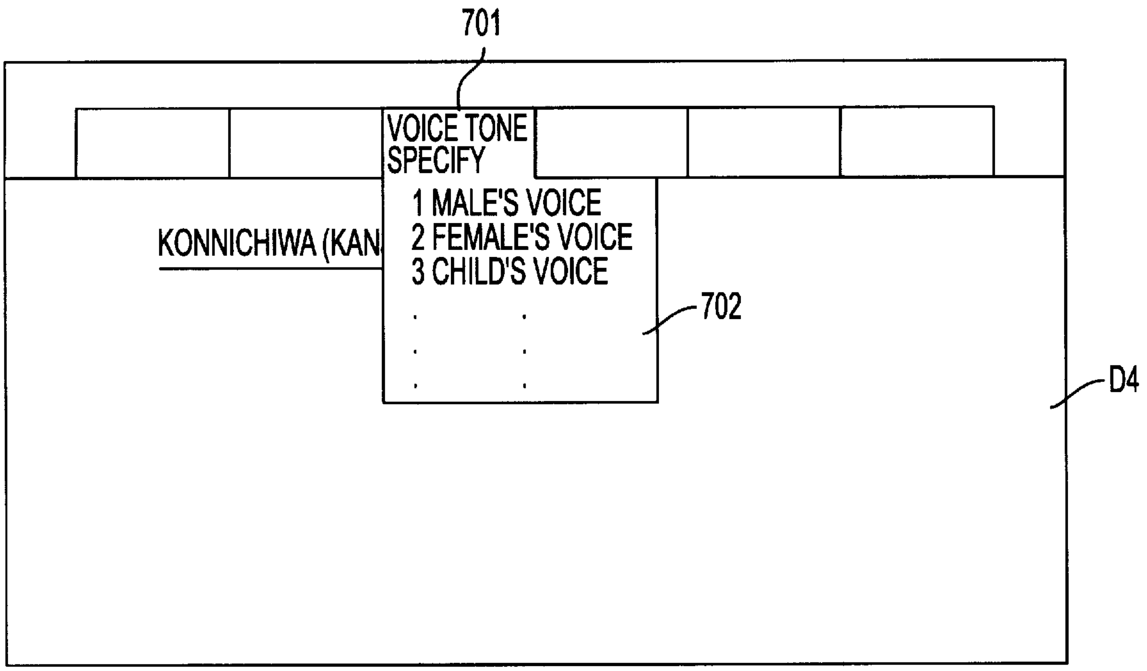

At first, a person who wishes to make a document inputs a character string constituting a word, a clause, or a sentence by using the key entry section 106 and the display section 107 (S501). For instance, when a character string of "konnichiwa (A)" is inputted through the key entry section 106, the character string of "konnichiwa (A)" is displayed on the display section 107 as shown on the display screen D1 in FIG. 6A. It should be noted that this character string of "konnichiwa (A)" can be used as it is, but it is assumed herein that a text, with a character string converted from "konnichiwa (A)" to "konnichiwa (B)" with kanji and kana mixed therein, as shown on the display screen D2 in FIG. 6B, is used by using the kana-kanji converting function.

Then, the operator retrieves any groups each having the character string information 202 identical to the character string of "konnichiwa (B)" inputted in step S501 from the talking way data storing section 103 (S502). In other words, any talking way data 201 corresponding to the character string of "konnichiwa (B)" is retrieved. To be more specific, as shown in FIG. 2, as groups of character string information 202 corresponding to the character string of "konnichiwa (B)", there are five types of talking way data 201 in a total of three types of "ko, n, ni, chi, wa" in the phoneme string information 203 as well as of two types of "kyo, u, wa" in the phoneme string information 203 each in the talking way data storing section 103.

After the step described above, the person who makes a document can specify voice tone data for adding voice tone to a voice to be synthesized (S503, S504). For example, as shown in the display screen D3 in FIG. 7A, the specification can be accomplished by having the voice tone specifying button 701 displayed, clicking the button with a mouse for having voice tone data stored in the voice tone data storing section 104 displayed thereon, and selecting any of the voice tone data. It should be noted that a voice tone selection number corresponding to the selected voice tone data (a number corresponding to the voice tone data shown in FIG. 7B) is stored herein, and after this operation, any voice tone data is specified with the voice tone select number. In a case where the specification of the voice tone data is not selected, it is assumed that the voice tone data specified at a previous time (namely, the voice tone select number previously selected) is specified again, and the system control goes to step S505.

Then, the voice synthesizing section 105 successively reads out the talking way data 201 in the group retrieved in step S502, and synthesizes a voice by using the phoneme string information 203, duration length 204, pitch information 205, and velocity information 206, each in the read out talking way data 201, and outputs the synthesized voice through the speaker 109 (S505). More specifically, the talking way data 201 including three types of the phoneme string information 203 of "ko, n, ni, chi, wa" 203 belonging to the retrieved group, as well as the talking way data 201 including two types of phoneme string information 203 of "kyo, U, wa" belonging the group, are successively synthesized into a voice and outputted.

The person who makes a document can listen to the talking way data 201 that is successively regenerated in order to select a desired voice (S506). Herein, operations in steps S505 to S506 is repeated until the desired voice is selected.

When the desired voice is selected in step S506, a voice-generating document data is prepared by correlating the voice stone data (voice tone selection number) in the step, and the talking way data 201 corresponding to the selected voice to the character string of "konnichiwa (B)" inputted in step S501 to each other, and the prepared information is stored in the voice-generating document storing section 110 (S507), and operations in steps S501 to S507 are repeated until a prespecified END key is specified (S508).

Figure 8:
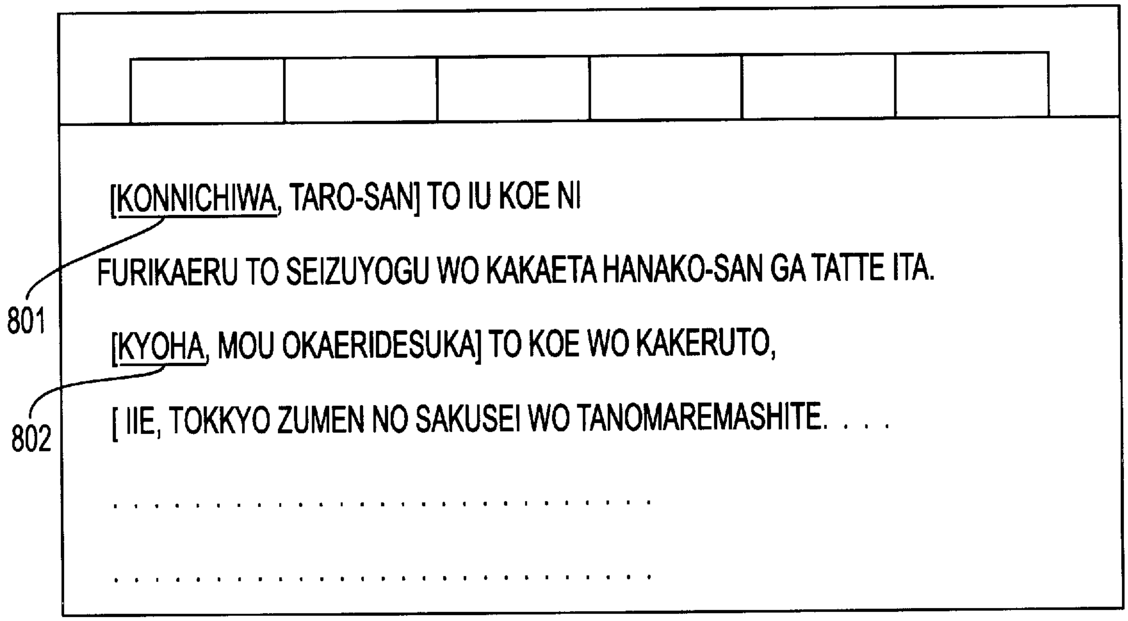
FIG. 8 is an explanatory view showing an example of a screen display of a voice-generating document prepared in the processing for preparing a voice-generating document.

FIG. 8 shows an example of displaying a voice-generating document prepared in the processing for making the voice-generating document on a display screen, and FIG. 9 shows an example of the voice-generating document data stored in the voice-generating document storing section 110. In the voice-generating document as shown in FIG. 8, it is possible to regenerate one voice-generating document with a plurality of voice tone data, for instance, when a voice is reproduced through the voice synthesizing section 105 by specifying a female's voice as voice tone data, for instance, to sections of "Konnichiwa, taro-san (male)" and "iie, tokkyo zumen no . . . " each of which Hanako-san (female) speaks and also by specifying a male's voice as voice tone data to the other section thereof.

Although the character string of "konnichiwa (B)" indicated by the reference numeral 801 is the same as that indicated by the reference numeral 802 each displayed on the screen as far as the character string is concerned, as indicated by the reference numerals 901, 902 in the voice-generating document data in FIG. 9, each of the phoneme string information 203 of the talking way data 201 is different from each other. Thus, the character string 801 is pronounced as "ko, n, ni, chi, wa", while the character string 802 is pronounced as "kyo, u, wa". Accordingly, the document can accurately be vocalized in the way it is read as intended by the person who makes a document.

As described above, in the processing for making a voice-generating document, it is possible to make voice-generating document data in which an inputted character string (character information) is matched to voice information (talking way data), including the way of talking intended by the operator making a document.

The voice-generating document data (in other words, talking way data 201) has the duration length 204, pitch information 205, and velocity information 206 other than the phoneme string information 203. Also, the person who makes a document can actually listen to a voice obtained by synthesizing the talking way data 201 to make voice-generating document data, so that it is possible to add some emotional expression or the like corresponding to non-language information to the voice-generating document data. This is accomplished by preparing information (voice-generating document data) having the way of talking intended by the person who makes a document, by adjusting an accent, a volume of a voice, and a pitch of a voice or the like.

As far as expression of emotion or the like, some emotion intended by a person who makes a document can be expressed by synthesizing a voice based on the talking way data 201 with the character string of "wakarimashita" (consisting of six Japanese characters with meaning of "understood") and selecting one of the following two types of talking.

(1) In a case where the character string of "wakarimashita" is pronounced with a rising intonation, the character string is expressed as an interrogative sentence for asking whether a talking partner understood what the speaker said or not. Some emotion that the speaker is more or less concerned about whether the partner understood it or not can be included in the sentence depending on how it is used in the sentence.

(2) In a case where, for instance, a volume is made larger only at a section of "ta" in the character string of "wakarimashita" and the word is shortly spoken, such fact that it is understood or that it is accepted is conveyed in the literary meaning of the word as data. On the other hand, such fact that the speaker perfectly understood what has been said or such negative feeling that the speaker is unpleasant, although it is understood or the speaker reluctantly accepts what has been told, can emotionally be expressed depending on how the intonation in the word described above is used in the sentence.

Figure 10:
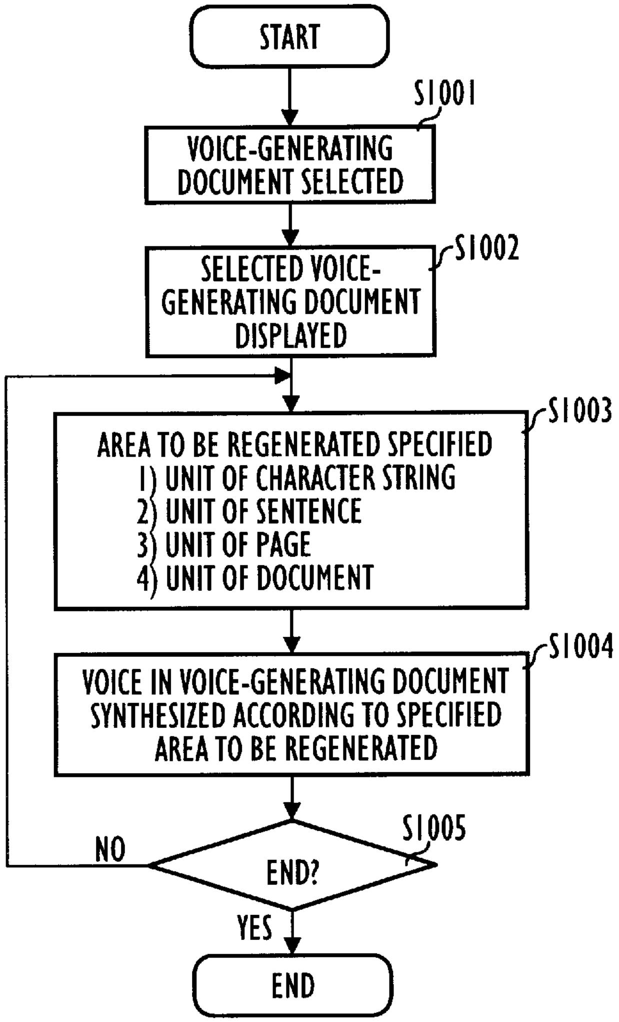
FIG. 10 is a flow chart showing outline of the processing for regenerating the voice-generating document according to Embodiment 1.
Figure 11:
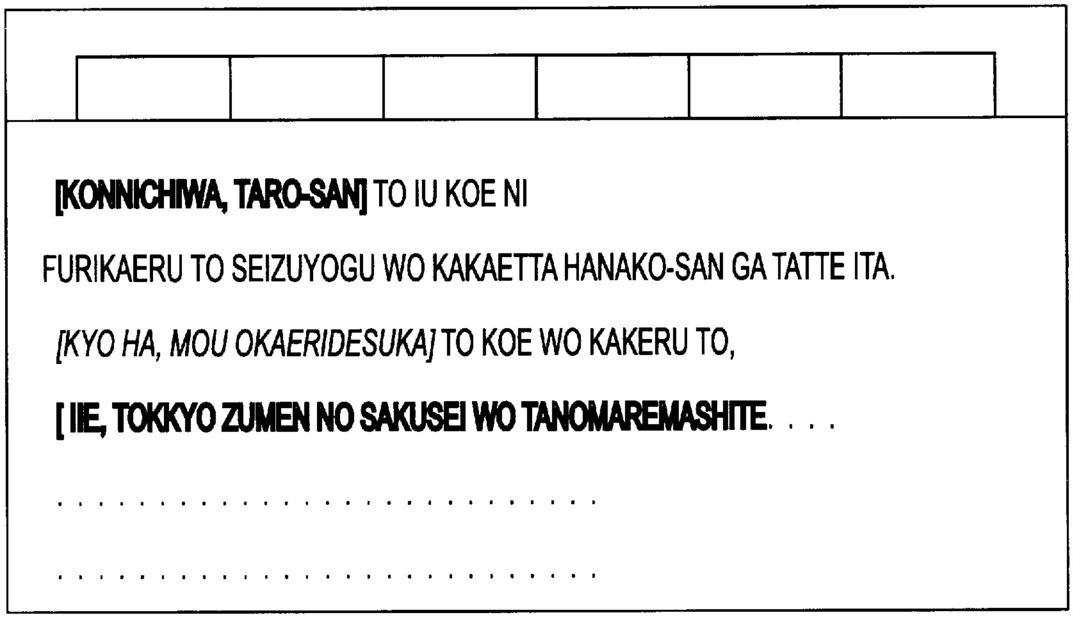
FIG. 11 is an explanatory view showing an example of a display screen in a display section in the processing for regenerating a voice-generating document.
Figure 12:
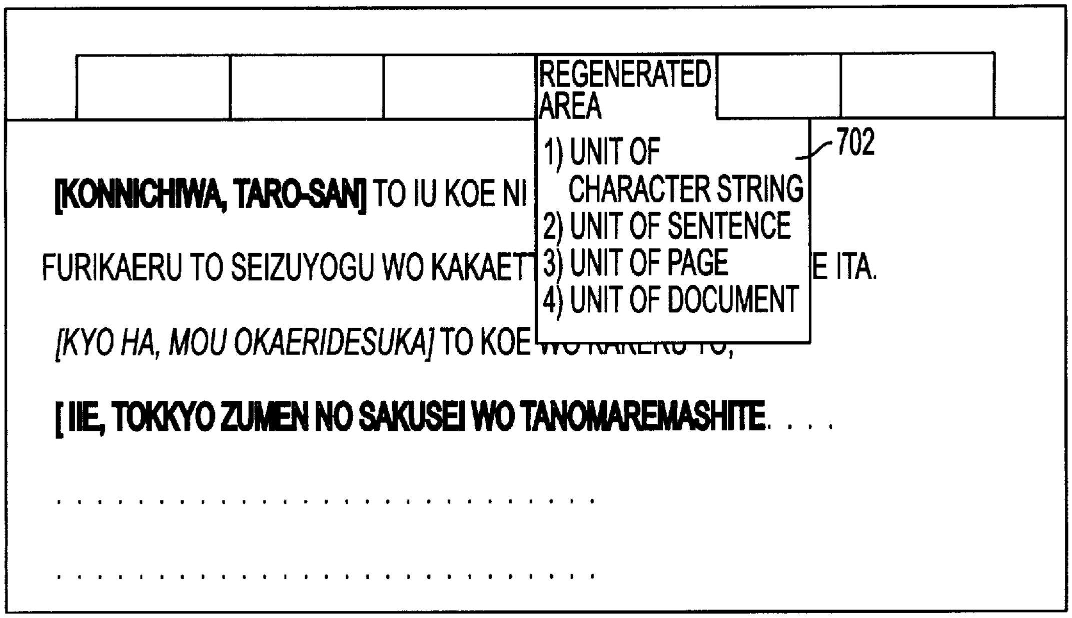
FIG. 12 is an explanatory view showing another example of a display screen in a display section in the processing for reproducing a voice-generating document.
Figure 13A:
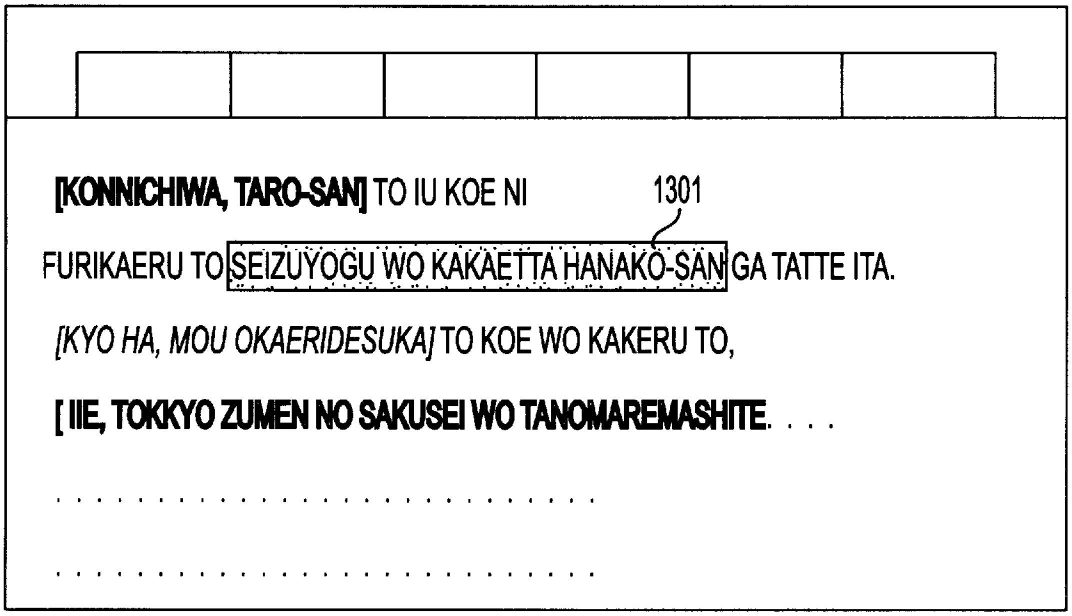
Figure 13A:
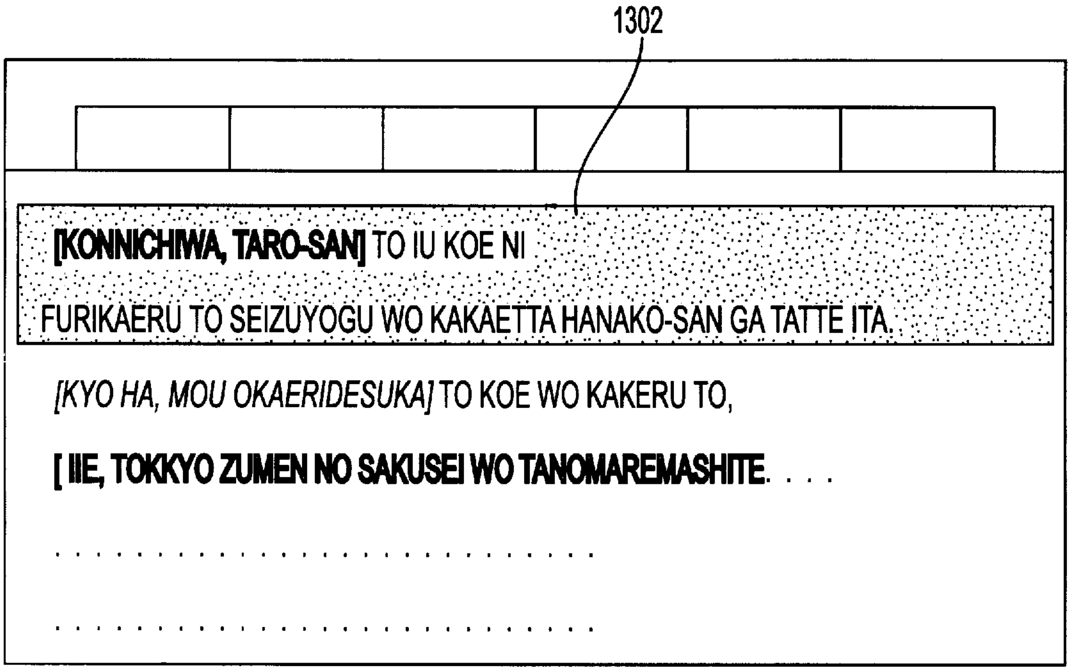

2) Description is made for processing for regenerating a voice-generating document with reference to FIG. 10 to FIG. 13. Herein, FIG. 10 is a schematic flow chart showing the processing for regenerating a voice-generating document, and FIG. 11 to FIG. 13 show examples of a display screen on the display section 107 in the processing for regenerating a voice-generating document. It should be noted that it is assumed herein that the control section 101 initiates the program for regenerating a voice-generating document stored in the application storing section 102 to execute the processing according to the schematic flow chart shown in FIG. 10 when the processing for regenerating a voice-generating document is selected from the information on the display screen of the display section 107, which is not shown herein.

At first, a list of the voice-generating documents stored in the voice-generating document storing section 110 is displayed on the display section 107 so that a person who makes a document will select a voice-generating document to be regenerated. When the person who makes a document selects a voice-generating document through the key entry section 106 (S1001), the selected voice-generating document is read out from the voice-generating document storing section 110 and displayed on the display section 107 (S1002). In this step, as shown in FIG. 11, it is convenient to enable visual identification of the difference between voice tone data obtained by having fonts in character strings or a decorative method (e.g., dotted/reversed display or the like) changed according to the voice tone data specified for each character string of the voice-generating document.

Then, the person who makes a document selects an area to be regenerated for regenerating a voice-generating document by using the key entry section 106 and the display section 107 and selecting any of (1) an arbitrary unit of character string in the voice-generating document, (2) a unit of a sentence, (3) a unit of a page, and (4) an entire voice-generating document (units of a document) each displayed on the display screen shown in FIG. 12 (S1003). Herein, for instance, when the unit of a character string (1) is selected and an arbitrary unit of a character string in the voice-generating document (at least one character string) is specified as shown on the display screen in FIG. 13A, the specified character string 1301 is displayed in a reversed form. Also, when the unit of a sentence (2) is selected and an arbitrary unit of a sentence in the voice-generating document (at least one sentence) is specified as shown on the display screen in FIG. 13B, the specified sentence 1302 is displayed in a reversed form. It should be noted that, in a case where a unit of a page (3) and an entire voice-generating document (4) are specified, the specified page number or any message indicating the specification of an entire document are displayed with the screen displayed as shown in FIG. 11.

When an area to be regenerated is specified in step S1003, the voice synthesizing section 105 successively reads out the appropriate voice-generating document data (talking way data and voice tone data) in the voice-generating document, according to the specified area to be regenerated, and synthesizes a voice (step S1004).

Then, when synthesis of the voice in the specified area to be reproduced ends, operations in steps S1003 to S1004 are repeated until the specified END button (not shown herein) for the processing for regeneration on the display section 107 is pressed down (S1005).

As described above, in the processing for regenerating a voice-generating document, the voice-generating document is previously prepared as voice-generating document data in which a character string (character data) is matched to voice information (talking way data), including the way of talking intended by the person who makes a document, so that only a voice which the operator wants to reproduce can visually be selected from the voice-generating document (displayed character strings) displayed on the display screen.

The voice-generating document data (in other words, talking way data 201) has the duration length 204, pitch information 205, and velocity information 206 other than the phoneme string information 203. Also, the person who makes a document can actually listen to a voice obtained by synthesizing the talking way data 201 to make the voice-generating document data, so that a voice can be reproduced as a voice with some emotional expression corresponding to non-language information added thereto.

Figure 14:
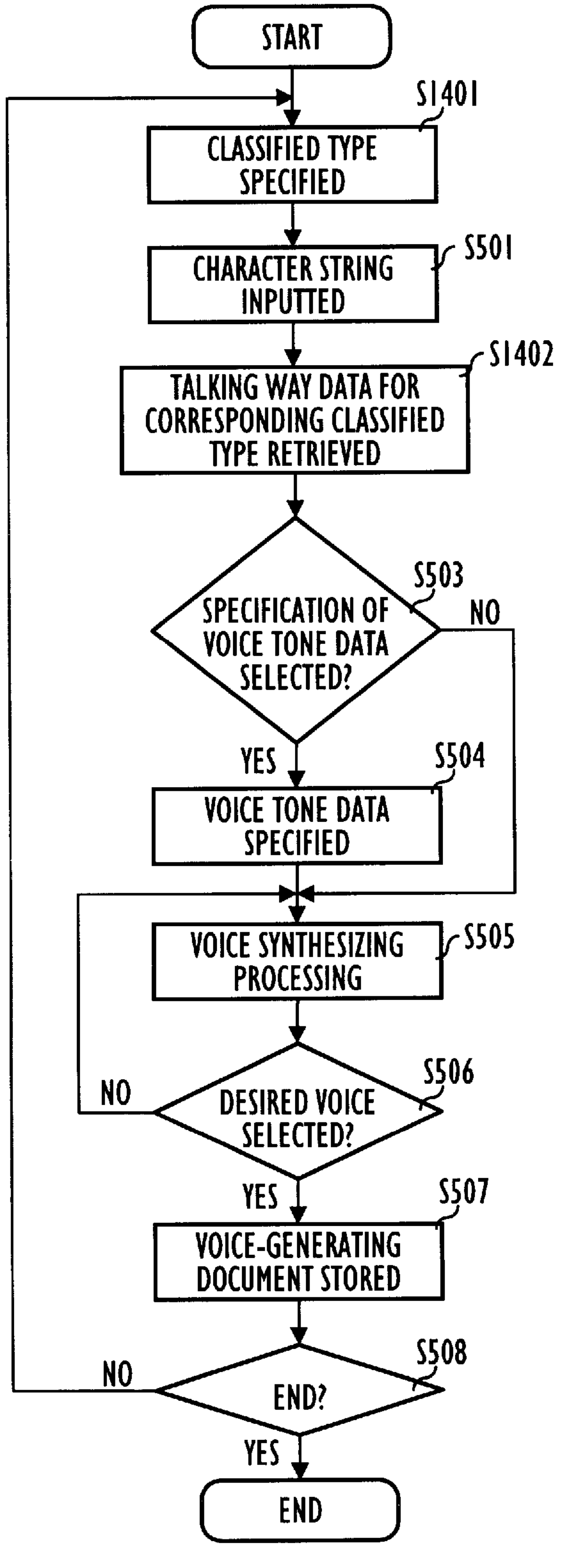
FIG. 14 is a flow chart showing outline of the processing for preparing a voice-generating document using type information according to Embodiment 1.

3) Description is made for processing for preparing a voice-generating document using type information. FIG. 14 is a schematic flow chart showing the processing for preparing a voice-generating document using type information, and it is assumed that the control section 101 initiates the program for preparing a voice-generating document using type information stored in the application storing section 102 to execute the schematic flow chart shown in FIG. 14 when the processing for preparing a voice-generating document using type information is selected from the information on the display screen of the display section 107 which is not shown herein.

It should be noted that the schematic flow chart shown in FIG. 14 is basically the same as that of the processing for making a voice-generating document shown in FIG. 5, so that the same reference numerals are assigned to the steps corresponding to those in FIG. 5 and description is made herein for only different portions thereof.

At first, a classified type of talking way data is specified by using the key entry section 106 and the display section 107 (S1401). Herein, as for a classified type, it is possible to use, for instance, types in which voices each corresponding to talking way data respectively are classified according to pronunciation types each specific to a particular area, such as Tokyo, Osaka, or Tokushima, as well as types in which voices are classified according to pronunciation types each specific to a particular age such as an old person, a young person, a high school student or the like. In other words, classified types are previously specified, and, for instance, in a case where a pronunciation type is specific to Osaka according to the prespecified classified types, information 201 for the way of talking in Kansai (west Japan) style is made and classified as a pronunciation type specific to Osaka to be registered in the type information 207 of each of the talking way data 201 respectively.

Figure 15:
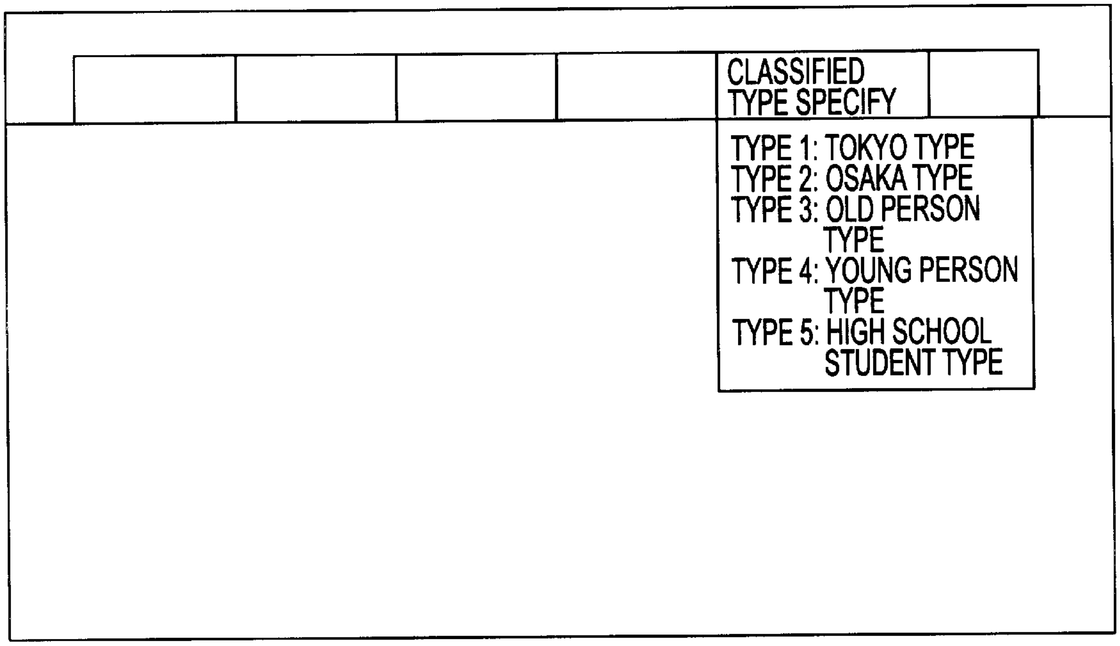
FIG. 15 is an explanatory view showing another example of a display screen in a display section in the processing for preparing a voice-generating document using type information.

FIG. 15 shows an example of a screen for specifying any of classified types. It is assumed herein that there are previously prepared five classified types such as TYPE 1: Tokyo type, TYPE 2: Osaka type, TYPE 3: Old person type, TYPE 4: Young person type, and TYPE 5: High school student type.

A character string is inputted (S501) after one of the classified types is specified, then any talking way data 201 belonging to a group with the same character string as the inputted character string and having the same type information as the specified classified type is retrieved from the talking way data storing section 103 using the inputted character string as well as the specified classified type in step S501 (S1402). In other words, only the talking way data 201 for the appropriate classified type is retrieved. In this step, in a case where a plurality of talking way data 201 for the appropriate classified type are present in the talking way data storing section 103, a plurality of talking way data 201 are retrieved.

After the step, any of voice tone data is specified (S503, S504).

Then, the voice synthesizing section 105 reads out the talking way data 201 retrieved in step S1402, and synthesizes a voice using the phoneme string information 203, duration length 204, pitch information 205, and velocity information 206, each in the read out talking way data 201, as well as the specified voice tone data, and outputs a synthesized voice through the speaker 109 (S505). As the classified type is specified herein, a voice based on only the appropriated talking way data 201 is synthesized.

After the above step, a desired voice is selected (S506), voice-generating document data for the selected voice is prepared and stored in the voice-generating document storing section 110 (S507), and operations in steps S1401, S501, S1402, and S502 to S507 are repeated until the prespecified END key is specified (S508). It should be noted that, in step S1401 in which the processing is executed after the second time, it is assumed that system control directly goes to step S501 and a character string can be inputted so far as any particular change has not been made to the classified type.

As described above, in the processing for preparing a voice-generating document using type information, it is possible to specify any classified type of talking way data 201 with which a voice is synthesized and reproduced. Thus, voice-generating document data (namely, a voice-generating document) in a type having a specified character in the way of talking can easily be prepared, which is convenient. Also, a period of time required for preparing a voice-generating document can be reduced.

It should be noted that, in the flow chart shown in FIG. 14, it is assumed that operations steps S503 to S506 are executed each time when a character string is inputted and then specification of voice tone data and selection of a voice are executed. However, there is no particular restriction over the sequence in the processing. Thus, there may be employed such a sequence in which the talking way data 201 in an appropriate classified type is retrieved in step S1402, system control goes to step S507, and a voice-generating document is automatically stored by using the retrieved talking way data 201. In this case, after some character strings constituting a voice-generating document are inputted, the processing between step S503 to step S506 is executed, and then voice tone data to each of the character strings can be specified.

4) In the processing for regenerating a voice-generating document using type information, a classified type used for regeneration is specified, appropriate talking way data 201 is retrieved from the talking way data storing section 103 by using the specified classified type as well as the character string information 202 and phoneme string information 203 in the voice-generating document prepared in the processing for preparing a voice-generating document described in 1) (document stored in the voice-generating document storing section 110). A voice is synthesized in the voice synthesizing section 105 by using the retrieved talking way data 201 as well as the voice tone data in the voice-generating document prepared in the processing for preparing a voice-generating document described in 1) (voice-generating document stored in the voice-generating storing section 110), and the synthesized voice is reproduced and outputted through the speaker 109.

In other words, the duration length 201, pitch information 205, and velocity information 206 in the talking way data 201 specified in the processing for preparing a voice-generating document described in 1) are not used. However, the duration length 204, pitch information 205, and velocity information 206 in the talking way data 201 specified by the type information 207 are used.

Figure 16:
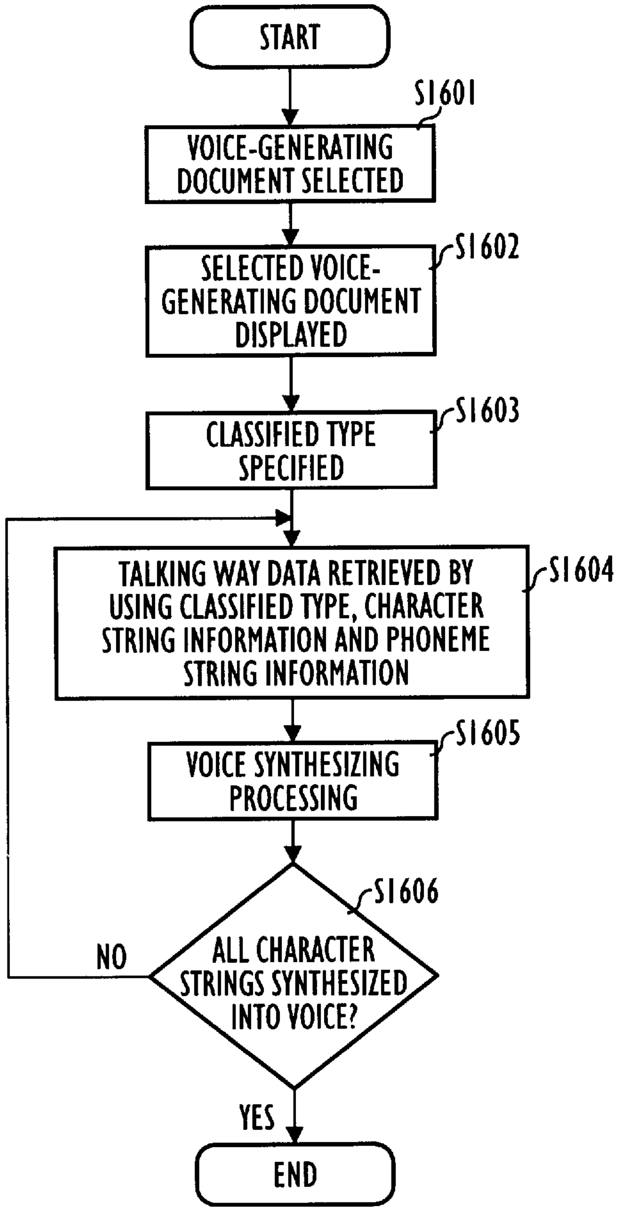
FIG. 16 is a flow chart showing outline of the processing for regenerating a voice-generating document using type information according to Embodiment 1.

FIG. 16 is a general flow chart showing a processing for regenerating a voice-generating document using type information. When a processing for regenerating a voice-generating document using type information is selected from a display screen of the display section 107 not shown herein, the control section 101 starts a voice-generating document regenerating program using the type information stored in the application storing section 102 and executes the processing sequence shown in the general flow chart in FIG. 16.

At first, a list of voice-generating documents stored in the voice-generating document storing section 110 is displayed, and a person who makes a document is prompted to select a voice-generating document to be regenerated. When the person who makes a document selects a voice-generating document to be regenerated through the key entry section 106 (S1601), the selected voice-generating document is read out from the voice-generating document storing section 110 and is displayed in the display section 107 (S1602).

Then, a classified type to be used for regeneration is specified through the key entry section 106 and display section 107 (S1603). It should be noted that the specification of a classified type can be executed by using the display screen in FIG. 15.

Thereafter, appropriate talking way data 201 is retrieved from the talking way data storing section 103 by using the specified classified type and the character string information 202 and phoneme string information 203 in the selected voice-generating document (S1604).

Then, the voice synthesizing section 105 synthesizes a voice by using the phoneme string information 203, duration length 204, pitch information 205, and velocity information 206 in the retrieved talking way data 201, as well as the voice tone data in the selected voice-generating document (voice tone data in the voice-generating document data including the phoneme string information 203 used for retrieval), reproduces and outputs the synthesized voice through the speaker 109 (S1605). With the step, the appropriate character string information 202 and phoneme string information 203 are synthesized into a voice with the specified classified data and voice tone data.

Finally, a determination is made as to whether all the character strings in the selected voice-generating document have been synthesized into a voice or not (S1606), and the steps S1604 and S1605 are repeated until all the character strings in the voice-generating document are synthesized into and outputted as voices. When the voices have been outputted, the processing is terminated.

As described above, by executing the processing for regenerating a voice-generating document by using type information, even in a case where a talking way (namely, talking way data 201) has been specified in the voice-generating document already prepared, a voice can be reproduced with a different talking way by specifying a classified type.

5) Next, a description is made for a way of newly preparing talking way data 201 and registering the data in the talking way data storing section 103 with reference to FIGS. 17 to 25. The talking way data 201 comprises, as shown in FIG. 2, the character string information 202, phoneme string information 203, duration length 204, pitch information 205, velocity information 206 and type information 207. For this reason, preparation of the talking data 201 involves the preparation or setting of this information.

It should be noted that, although as a rule a plurality of types of talking way data 201 are prepared and registered as standards in the talking way data storing section 103, a range of selection of talking ways (voices) can be widened by preparing and registering talking way data 201 according to a sense of each individual person who makes a document to increase the expression capability of each voice-generating document.

Figure 17:
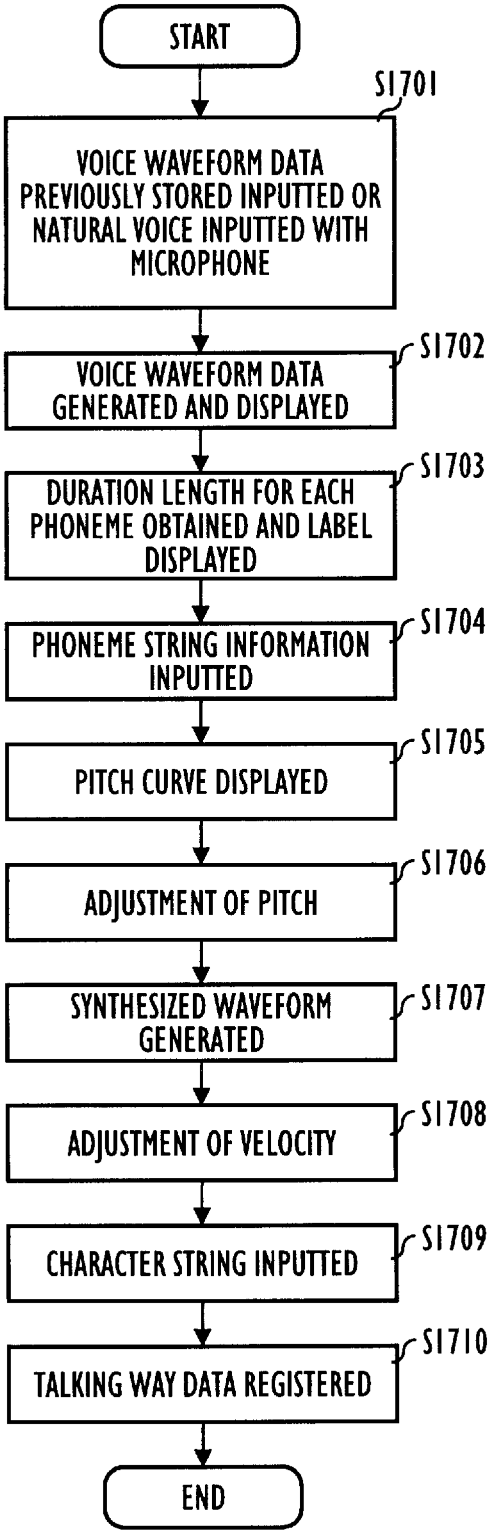
FIG. 17 is a flow chart showing outline of the processing for generating and registering talking way data according to Embodiment 1.

FIG. 17 is a general flow chart showing a processing for preparing and registering talking way data. At first voice waveform data previously recorded is inputted or a natural voice (a voice pronounced by a user) is inputted with a microphone 108 (S1701). The inputted natural voice is analyzed and digitalized, and then the voice waveform data is generated and displayed on the display section 107 (S1702). It should be noted that the previously recorded voice waveform data indicates voice waveform data prepared by inputting a natural voice with the microphone 108 and stored through the application storing section 102, I/F 111 and FD drive 112 in the FD 112*a*. Also, voice waveform data recorded with other devices may be inputted and used.

Figure 18:
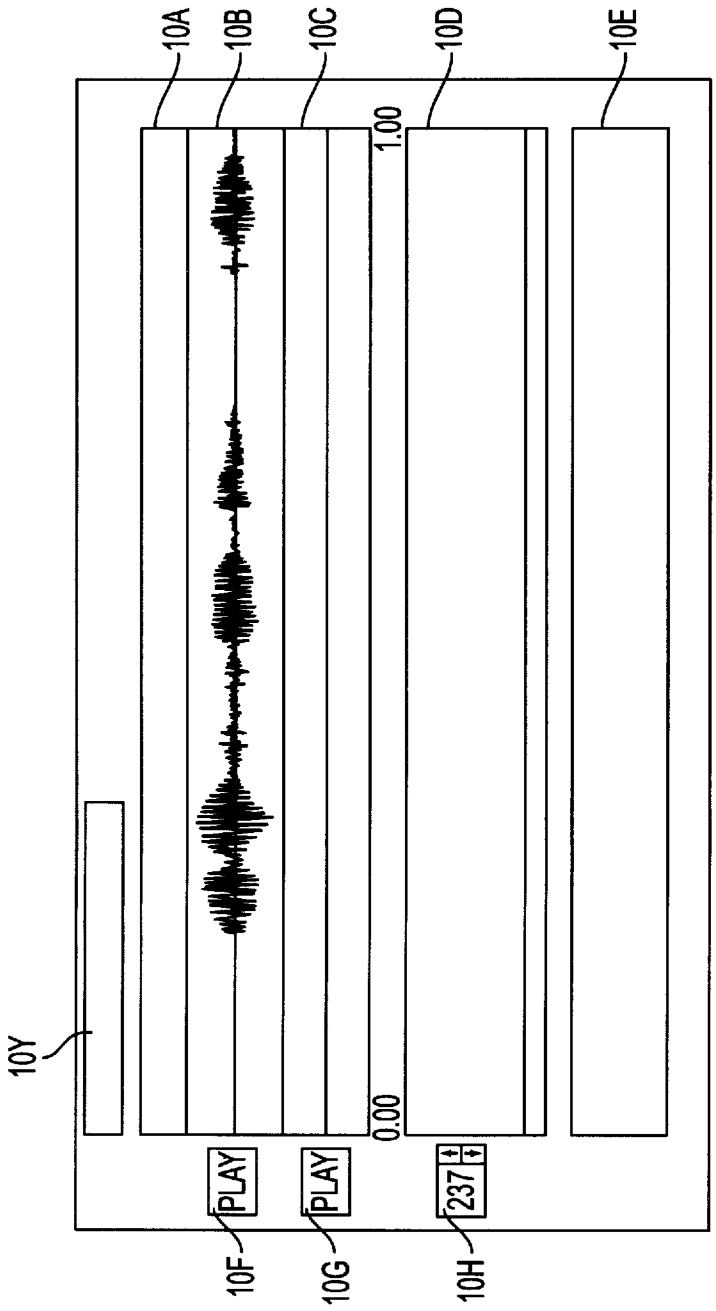
FIG. 18 is an explanatory view showing a display screen in the processing for generating and registering talking way data.
Figure 19:
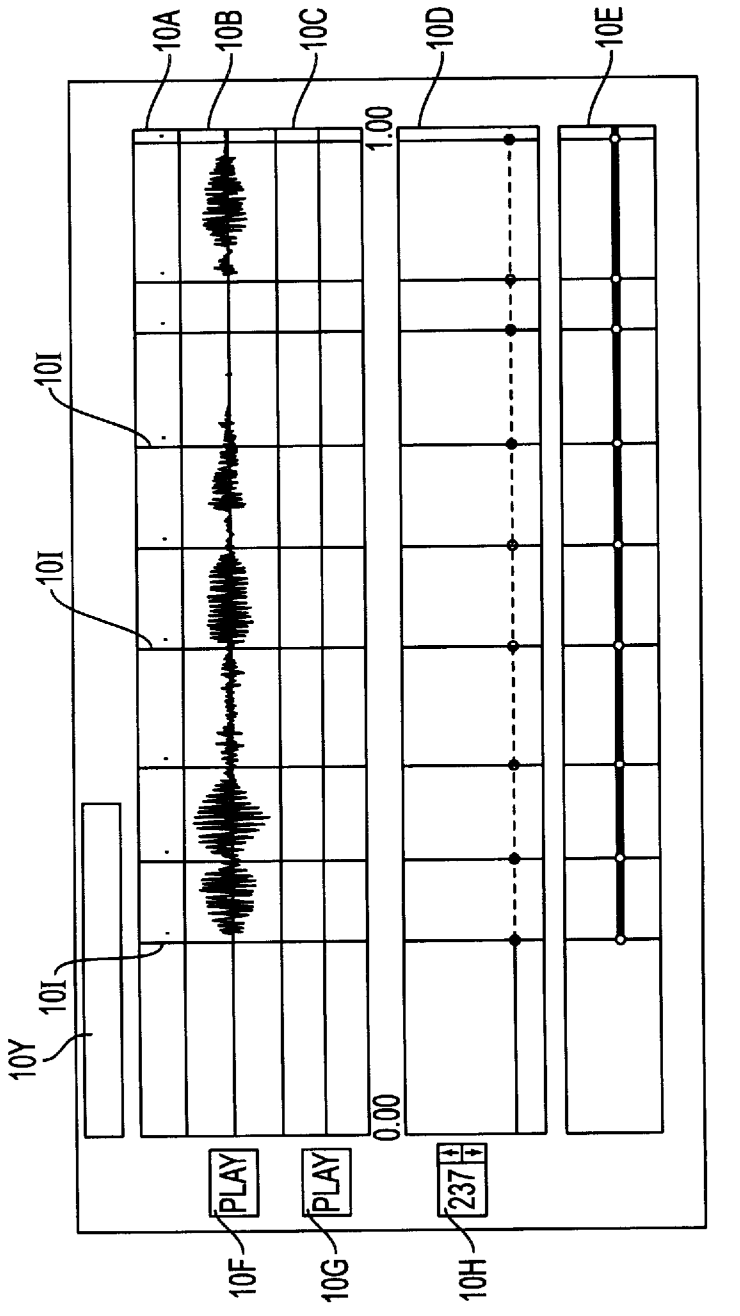
FIG. 19 is an explanatory view showing another example of a display screen in the processing for generating and registering talking way data.

The generated voice waveform data is displayed on the display screen in the display section 107 as indicated by 10B in FIG. 18. It should be noted that FIG. 18 shows a display screen for preparing and registering talking data displayed in the display section 107 and the display screen comprises a syllable display window 10A which is a window for displaying the phoneme string information 203, an original waveform display window 10B which is a window for waveform data generated from an inputted natural voice, a synthesized waveform display window 10C which is a window for displaying waveform data synthesized from the talking way data 201, a pitch display window 10D which is a window for displaying the pitch information 205, a velocity display window 10E which is a window for displaying velocity information 206, an original voice reproduction/stop button 10F used for starting or stopping regeneration of voice waveform data displayed in the original waveform display window 10B, a voice reproduction/stop button 10G using for starting or stopping regeneration of waveform data displayed on the synthesized waveform display window 10C, a pitch reference setting scale 10H for setting a pitch reference for the pitch information 205, and a character string input area 10Y for inputting the character string information 202.

Then, phoneme analysis for the voice waveform data generated in step S1702 is executed to obtain a duration length for each phoneme, a label visualizing the obtained duration length for each phoneme in the time axis is generated and the label is displayed in the display section 107 (S1703). Herein the visualized label indicates the line 10I crossing each of the windows 10A to 10E in the vertical direction as shown on the display screen in FIG. 19. It should be noted that a position of each label 10I automatically assigned through phoneme analysis can manually be moved (or changed) with a mouse in the key entry section 136. This feature is for making it possible to assign the label 10I at a more appropriate position in a case where precision of phoneme analysis is low.

Figure 20:
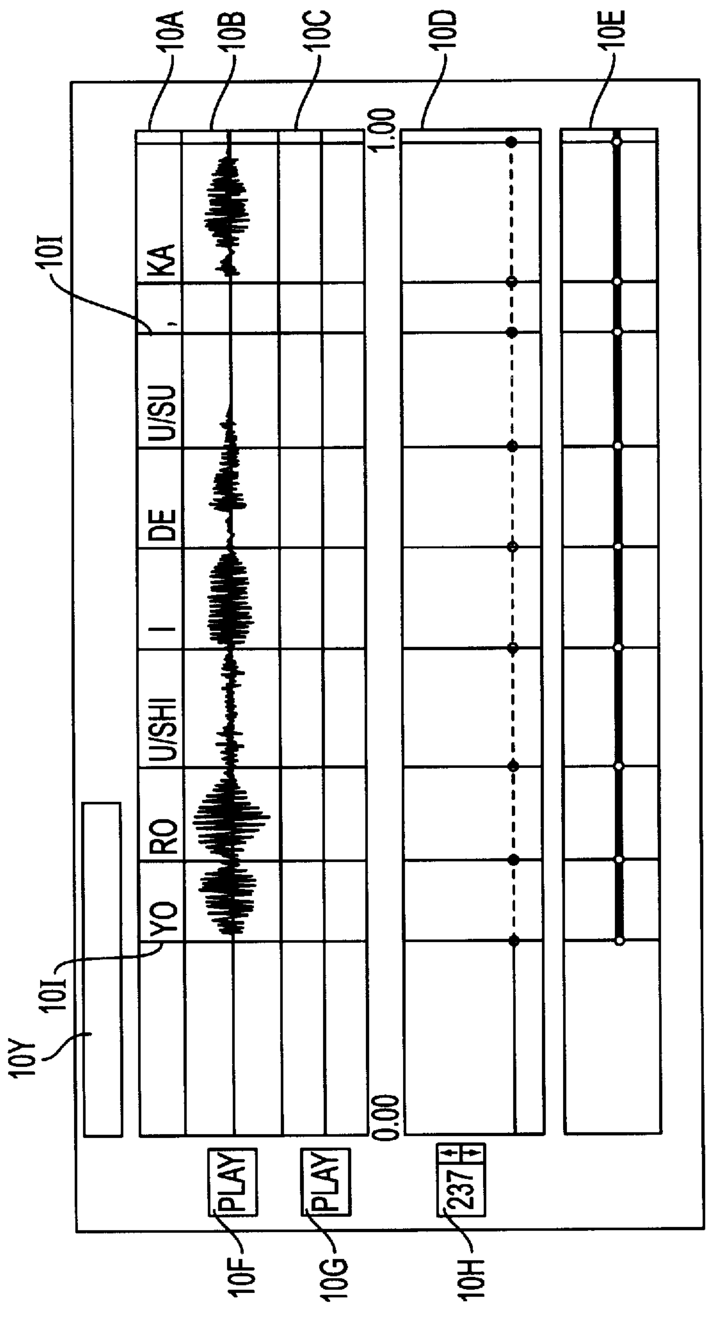
FIG. 20 is an explanatory view showing another example of a display screen in the processing for generating and registering talking way data.

Then, phoneme string information corresponding to the space separated by the set label (namely, a duration length) 10I is inputted (S1704). Specifically, an appropriate phoneme (character) is manually inputted between the labels 10I in the syllable display window 10A using the key entry section 106. FIG. 20 shows an example of an input of the phoneme string information 203, and shows a case where phonemes are inputted in the order of "yo", "ro", "U/shi", "de", "U/su", "," and "ka" in the direction of time axis. Of the inputted phonemes above, "U/shi" and "U-su" indicate a devocalized phoneme respectively, and others indicate vocalized phonemes.

Figure 21:
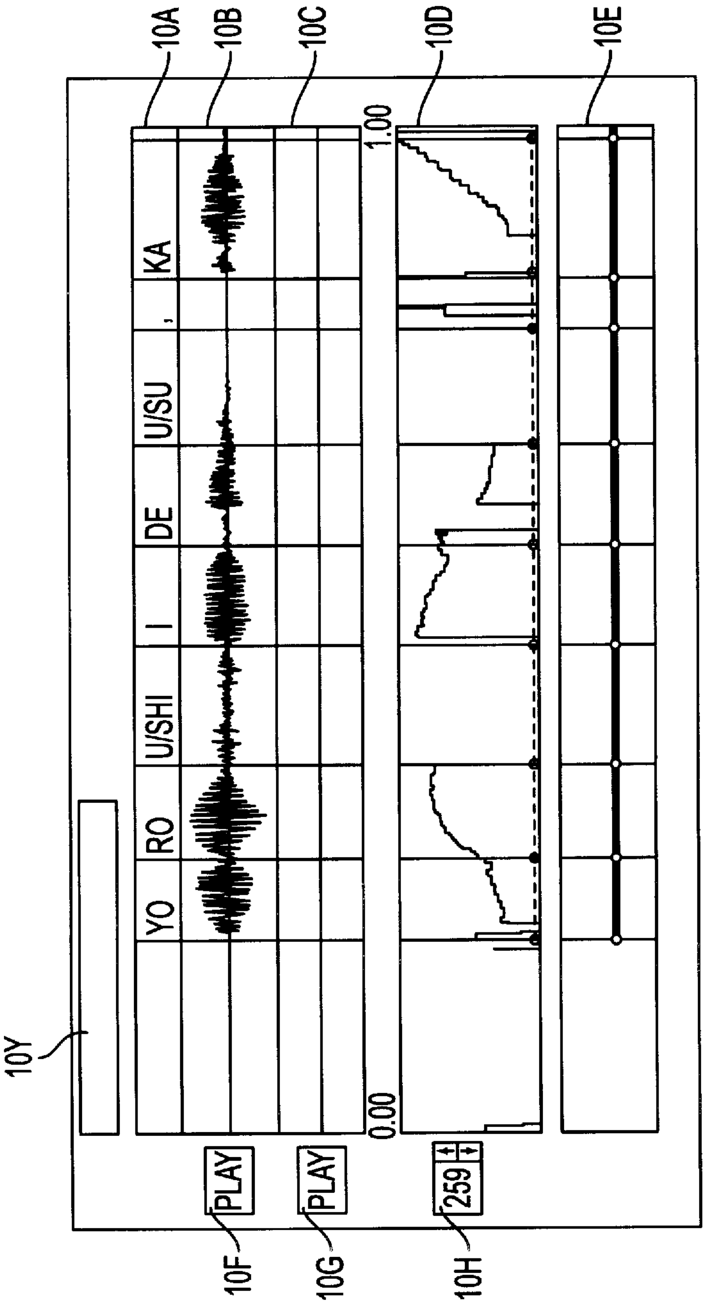
FIG. 21 is an explanatory view showing another example of a display screen in the processing for generating and registering talking way data.

In the next step S1705, the voice waveform data is subjected to pitch analysis and a pitch curve is displayed. In FIG. 21, a pitch curve subjected to pitch analysis displayed in the pitch display window 10D is shown.

Figure 22:
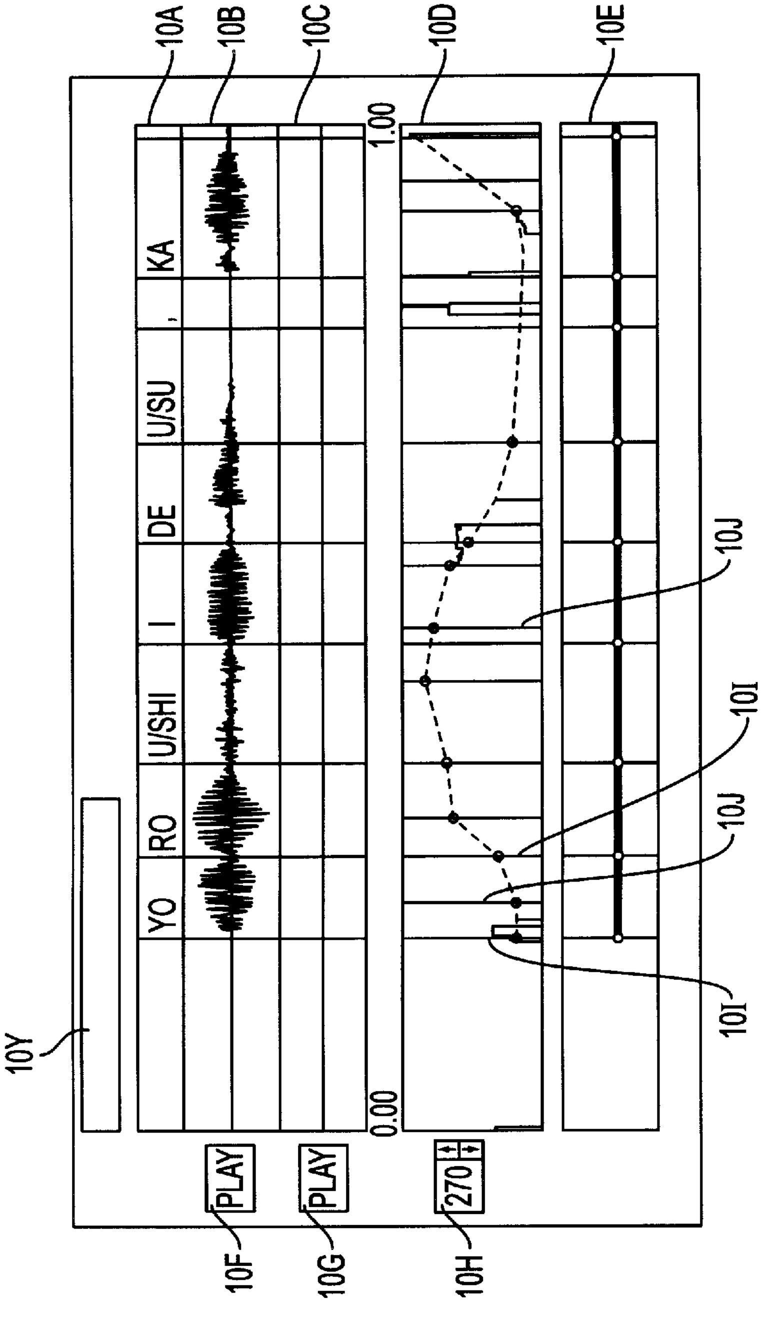
FIG. 22 is an explanatory view showing another example of a display screen in the processing for generating and registering talking way data.

In the next step S1706, pitch adjustment is executed. This pitch adjustment includes such operations as the addition or deletion of a pitch label described later, or the change of a pitch value as a pitch reference. Namely, in step S1706, a pitch value for the phoneme string information 203 at an arbitrary point of time is adjusted or added to generate the pitch information 205. FIG. 22 shows a case where a pitch label 10J is added in pitch adjustment, and further the pitch label 10J is added to the label 10I for dividing the phoneme from other ones. This addition operation can be executed by directly specifying a label position with a mouse or other device within the pitch display window 10D. The pitch newly added as described above is connected to an adjoining pitch with a straight line, so that a desired pitch change can be given within one phoneme and it becomes easier to process the voice into a desired voice quality.

Figure 23:
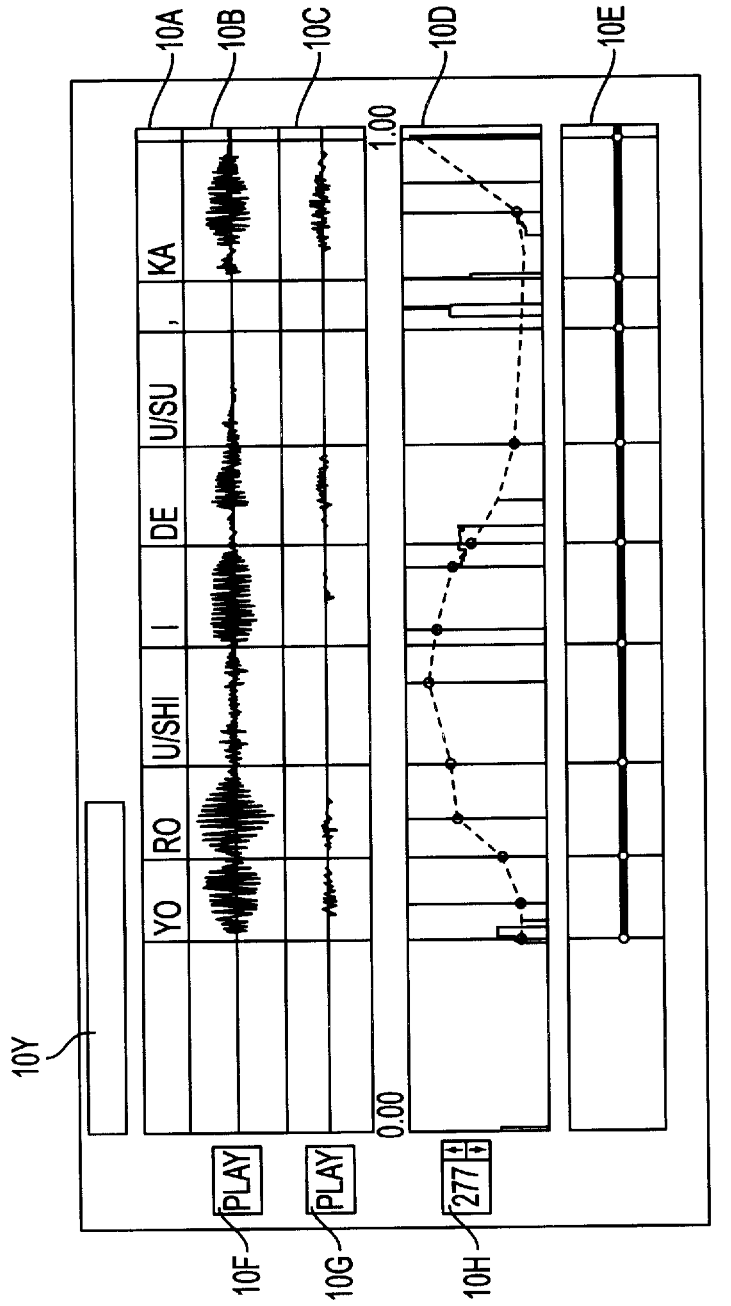
FIG. 23 is an explanatory view showing another example of a display screen in the processing for generating and registering talking way data.

In the next step S1707, a synthesized waveform having been subjected to pitch adjustment in the processing up to step S1706 is generated, and for instance, as shown on the display screen in FIG. 23, the synthesized waveform data is displayed in the synthesized waveform display window 10C. At this step, velocity has not been set, and as shown in the figure, plain velocity is displayed in the velocity display window 10E.

Although a detailed description is not made herein, in step S1707, the synthesized waveform data displayed in the synthesized waveform display window 10C can be regenerated and compared to the original voice waveform data displayed in the original waveform display window 10B. It is assumed in this step that a type of voice tone of a synthesized voice (voice tone data) is a default voice tone. Specifically, it is possible to start or stop regeneration of the synthesized waveform data by operating the voice reproduction/stop button 10G, or to start or stop regeneration of voice waveform data by operating the original voice reproduction/stop button 10F.

Figure 24:
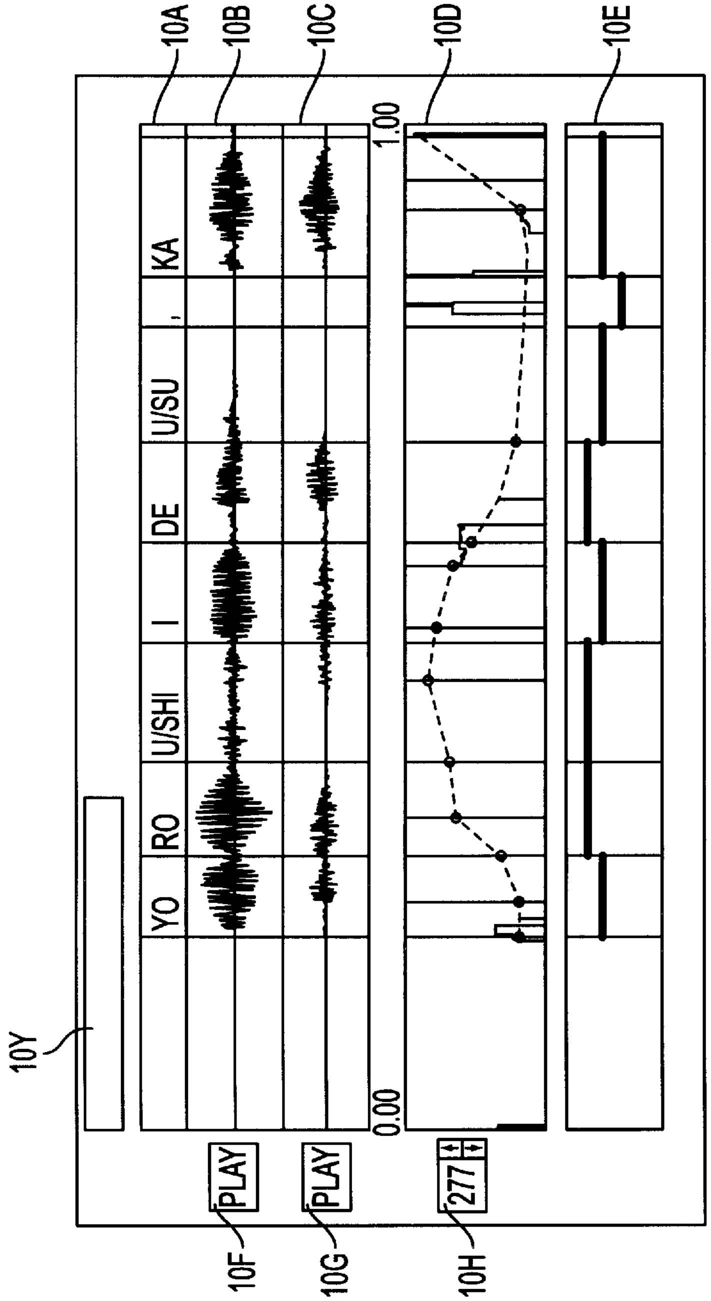
FIG. 24 is an explanatory view showing another example of a display screen in the processing for generating and registering talking way data.
Figure 25:
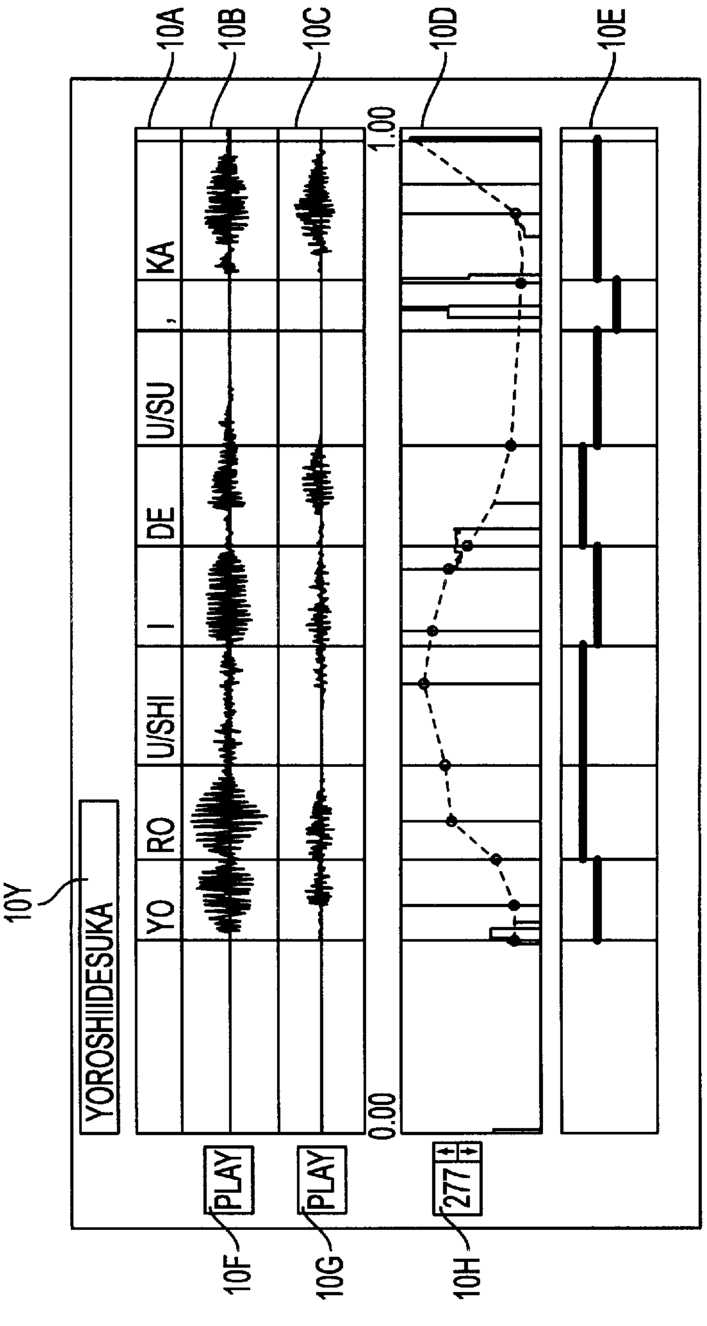
FIG. 25 is an explanatory view showing another example of a display screen in the processing for generating and registering talking way data.

In the next step S1708, velocity (velocity information) indicating a volume of a phoneme is manually adjusted. Namely, the velocity information 206 is generated by adjusting a volume of each phoneme in the phoneme string information 203. This velocity adjustment is executed for each phoneme as shown in FIG. 24, and the adjustment is executed within a range of prespecified stages (for instance, 16 stages).

After this velocity adjustment, if an operation is executed for regeneration of the synthesized waveform data again, the amplitude of voice changes for each phoneme to add intonation of a voice (voice tone) by comparing the voice amplitude to the plain velocity state.

Then, in step S1709, a person who makes a document (herein a maker of talking way data) inputs a character string corresponding to the voice waveform data intended by the maker to set the character string information 202. For instance, if the character string of "yoroshiidesuka" is inputted through the key entry input section 106 in the character string input area 10Y, the character string of "yoroshiidesuka" is set as the character string information 202.

In the next step S1710, an appropriate group in the talking way data storing section 103 is retrieved according to the character string information 202 set up as described above, and the talking way data 201 is added and registered in the retrieved group. Namely, the talking way data 201 is generated from the character string information 202 set in the character string input area 10Y, phoneme string information 203 inputted in the syllable display window 10A, duration length 204 set as a visualized label, pitch information 205 set in the pitch display window 10D, and velocity information 206 set in the velocity display window 10E and the generated talking way data 201 is stored in the talking way data storing section 103.

Although description is not made, it is assumed herein that the type information 207 for the talking way data 201 registered as described above, is set by executing operations for setting and changing a classified type separately after registration of the talking way data 201. This processing sequence is employed because, if an operation for generating the talking way data 201 and an operation for setting a classified type are executed simultaneously, a sense of the person who makes a document becomes dull and classification of types cannot be executed accurately. It is needless to say that the type information 207 may be set by adding a step for that purpose after the step S1709 described above.

Although voice waveform data is generated in Embodiment 1 by inputting a natural voice with the microphone 108, the talking way data 201 may be newly prepared and registered in the talking way data storing section 103. This is accomplished by specifying one of the talking way data stored in the talking way data storing section 103, inputting the data as original voice waveform data, adjusting the duration length 204, pitch information 205 and velocity information 206 included in this talking way data 201 and using the character string information 202 and phoneme string information 203 included in the talking way data 201 as well as the duration length 204, pitch information 205, and velocity information 206, each having been subjected to adjustment.

Although a label is generated in step S1703 and then phoneme string information is inputted in step S1704 in Embodiment 1, for instance, the phoneme string information may be inputted first and then a label may be generated. Further, also it is possible to automate the steps from input of phoneme string information up to generation of a label by using the voice recognizing technology.

6) In the processing for changing a voice-generating information, a voice-generating document stored in the voice-generating document storing section 110 is again displayed in the display section 107 and a character string constituting the voice-generating document and the talking way data 201 are changed.

Figure 26:
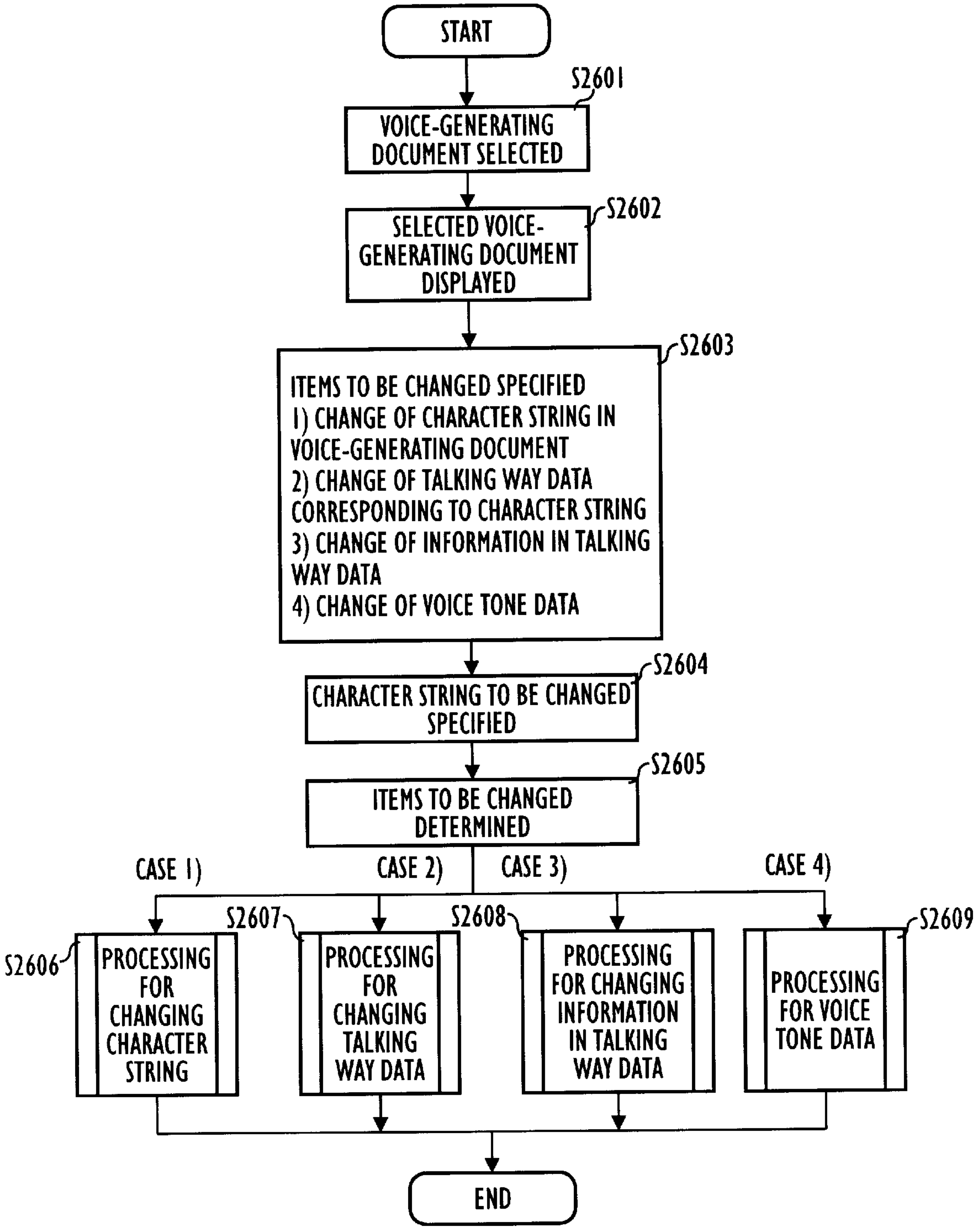
FIG. 26 is a flow chart showing outline of the processing for changing a voice-generating document according to Embodiment 1.

FIG. 26 is a general flow chart showing the processing for changing a voice-generating document. At first, a list of voice-generating documents stored in the voice-generating document storing section 110 is displayed in the display section 107, and a person who makes a document is prompted to select a voice-generating document to be changed. When the person who makes a document selects a voice-generating document through the key entry section 106 (S2601), the selected voice-generating document is read out from the voice-generating storing section 110 and displayed in the display section 107 (S2602).

Then, an item or items to be changed are specified on the display screen (not shown herein) (S2603). Herein, items to be changed include (1) a character string in a voice-generating document, (2) talking way data corresponding to the character string, (3) information in the talking way data, and (4) voice tone data.

When a character string to be changed is specified (S2604), the item specified in step S2603 to be changed is determined (S2605), and system control goes to any of steps S2606 to S2609 according to the item to be changed.

(1) In a case where a character string in a voice-generating document is to be changed, system control goes to step S2606, and processing for changing the character string is executed. The processing for changing a character string is executed according a processing sequence basically similar to that shown by the general flow chart for preparing a voice-generating document shown in FIG. 5. The different portion is the point that a voice-generating document (the original voice-generating document stored in the talking way data storing section 103) in the character string portion specified to be changed is replaced by using the generated voice-generating document(namely, the voice-generating document prepared by using the inputted character string) in step S507 in FIG. 5.

(2) In a case where talking way data corresponding to a character string is to be changed, system control goes to step S2607, and the processing for changing the talking way data is executed. In the processing for changing the talking way data, basically the steps shown in the general flow chart for preparing a voice-generating document in FIG. 5 excluding step S501 are executed. A different portion is the point that a voice-generating document corresponding to the character string portion specified to be changed (original voice-generating document stored in the talking way data storing section 103) is replaced by using the prepared voice-generating document (namely, a voice-generating document after the talking way data is changed) in step S507 in FIG. 5.

(3) In a case where information in talking way data is to be changed, system control goes to step S2608, and processing for changing information in talking way data is executed. The processing for changing information in talking way data can be executed according to a method basically similar to that for preparing and registering talking way data shown in FIG. 17. Namely, the character string information 202, phoneme string information 203, duration length 204, pitch information 205, and velocity information included in the talking way data 201 in the character string section specified to be changed are set as original data in the character string input area 10Y, syllable display window 10A, visualized label, pitch display window 10D, and velocity display window 10E respectively, and then the talking way data 201 is changed by adjusting the visualized label, pitch, and velocity.

(4) In a case where voice tone data is to be changed, system control goes to step S2609, and processing for changing voice tone data is executed. In the processing for changing talking way data, basically, the steps S503 and S504 in the general flow chart for preparing a voice-generating document in FIG. 5 are executed. Namely, voice tone data in a voice-generating document corresponding to a character string specified to be changed is replaced with voice tone data newly specified.

As described above, a voice-generating document stored in the voice-generating document storing section 110 can be changed, so that it is possible to efficiently use the prepared voice-generating document. For instance, it is possible to prepare a voice-generating document having a fixed format and then use it by changing only a required portion.

As described above, in Embodiment 1, it is possible to prepare information (voice-generating document) in which two expression types of information, namely, character information (character string) and voice information (talking way data), are mixed with a high degree of matching.

Also, in a voice-generating document prepared by the voice-generating voice making apparatus 100, character information and voice information including information on a way of talking intended by a person who makes a document correspond to each other in the form of one-to-one, so that, even if an operation similar to moving or copying of a document in an ordinary type of document making apparatus (such as Japanese word processor, or an English word processor) is executed, matching between the character information and voice information is not lost, whereby it is possible to easily edit a voice-generating document. For this reason, a user can do a job by not only hearing but also watching a screen, which makes it easier to edit voice information.

Further, it is possible to display both characters and voice simultaneously according to a purpose of use, and also to separate and display either one of the two types of information. For instance, in a case where a voice-generating document prepared by the voice-generating document making apparatus according to the present invention is received in a form of an electronic mail or the like, it is possible to take out only the voice information (a voice synthesized by using talking way data) from a remote site through a telephone line.

Also, a person who makes a document can make a voice-generating document by selecting a desired voice (talking way data), so when a voice is synthesized according to a prepared voice-generating document, it is possible to output a voice not including mistakes in reading or accent, in other words, an accurate voice intended by the person who makes a document.

Also, the sequence for making a voice-generating document described in Embodiment 1 can be materialized in a program, and this program can be stored as a computer-executable program in a computer-readable medium.

In second embodiment of the present invention, it is possible to edit the talking way data 201 (or to change information in the talking way data) during processing for preparing a voice-generating document, and the velocity information 206 in the talking way data 201 specifies a relative volume of a voice in the phoneme string information 203 at an arbitrary point of time. It should be noted that, as the basic configuration and operation are the same as those of the voice-generating document making apparatus 100 according to first embodiment, description is made herein only for the different portions.

Figure 27:
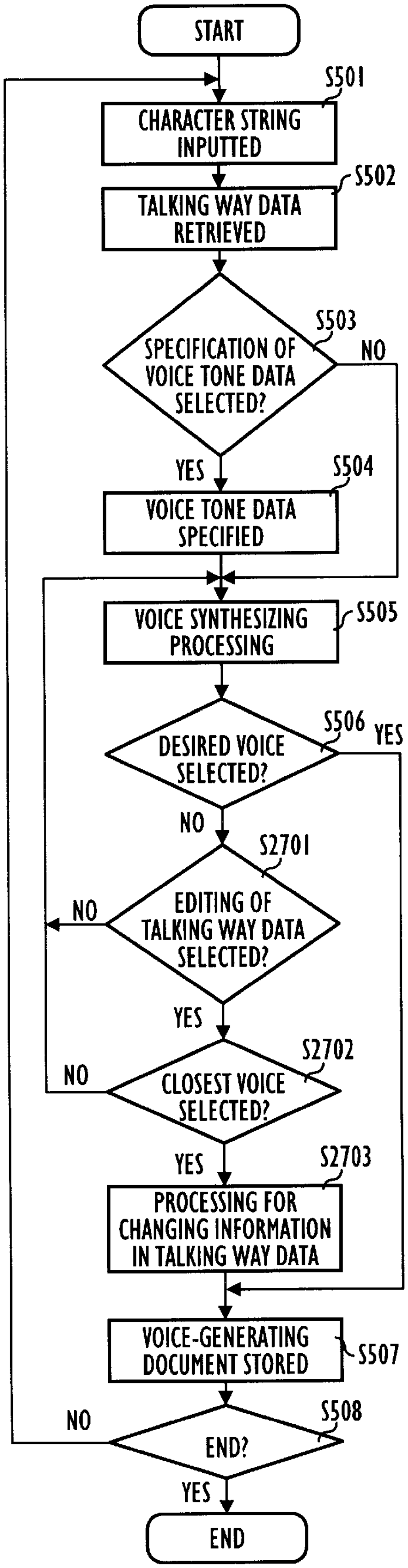
FIG. 27 is a flow chart showing outline of the processing of making a voice-generating document according to Embodiment 2.

FIG. 27 is a general flow chart showing processing for preparing a voice-generating document in second embodiment. The basic operations in this sequence are the same as those in the processing for preparing a voice-generating document in Embodiment 1 shown in FIG. 5, so that herein only brief description is made by assigning common reference numerals to common steps respectively.

At first, a person who makes a document inputs character strings each constituting a word, a clause, or a sentence with the key entry section 106 and display section 107 (S501). Next, the person who makes a document retrieves a group having the same character string information 202 as the character string inputted in step S501 from the talking way data storing section 103 (S502).

Then, the person who makes a document selects whether there is a specification of voice tone data and specifies voice tone data for adding voice tone to a voice to be synthesized (S503, S504). Herein, a voice tone selection number corresponding to the selected voice tone data is maintained, and then voice tone data is identified according to the voice tone selection number. In a case where specification of voice tone data is not selected, it is assumed that the voice tone data specified previously (namely the voice tone selection number selected previously) is specified again, and system control goes to step S505.

Then, the voice synthesizing section 105 successively reads out the talking way data 201 in the group retrieved in step S 502, and synthesizes a voice using the phoneme string information 203, duration length 204, pitch information 205 and velocity information 206 in the talking way data 201 read out as described above as well as the specified voice tone data, and outputs the synthesized voice through the speaker 109 (S505).

Then, the person who makes a document selects, hearing the talking way data 201 successively regenerated, a desired voice or edition of talking way data in a case where the desired voice is not available, and then selects the closest voice. It should be noted that selection of editing the talking way data is executed according to a method similar to that as shown on the display screen for specification of voice tone data shown in FIG. 7. According to whether the selection was made or not, determination is made in step S506 and step S2701 as to whether a voice is selected or editing of talking way data is selected.

When a desired voice is selected, voice-generating document data is prepared by correlating the voice tone data at the point of time (voice tone selection number), talking way data 201 corresponding to the selected voice, and the character string inputted in step S501 to each other, the voice-generating document data is stored in the voice-generating document storing section 110 (S507), and the processing in step S501 and on are repeated until a specified end key is specified.

One the other hand, when editing of talking way data is selected, system control goes to step S2702, a determination is made as to whether the closest voice has been selected or not, and when the closest voice is selected, system control goes to step S2703, and as described later, operations are executed according to the general flow chart for changing information in the talking way data in FIG. 28.

Then, voice-generating document data is prepared by correlating the talking way data 201 changed in the processing for changing information in the talking way data, the voice tone data at the point of time (voice tone selection number), and the character string inputted in step S501 to each other. The voice-generating document data is thereafter stored in the voice-generating document storing section 110 (S507), and the operations in step S501 and on are repeated until a specified END key is pressed down (S508).

Figure 28:
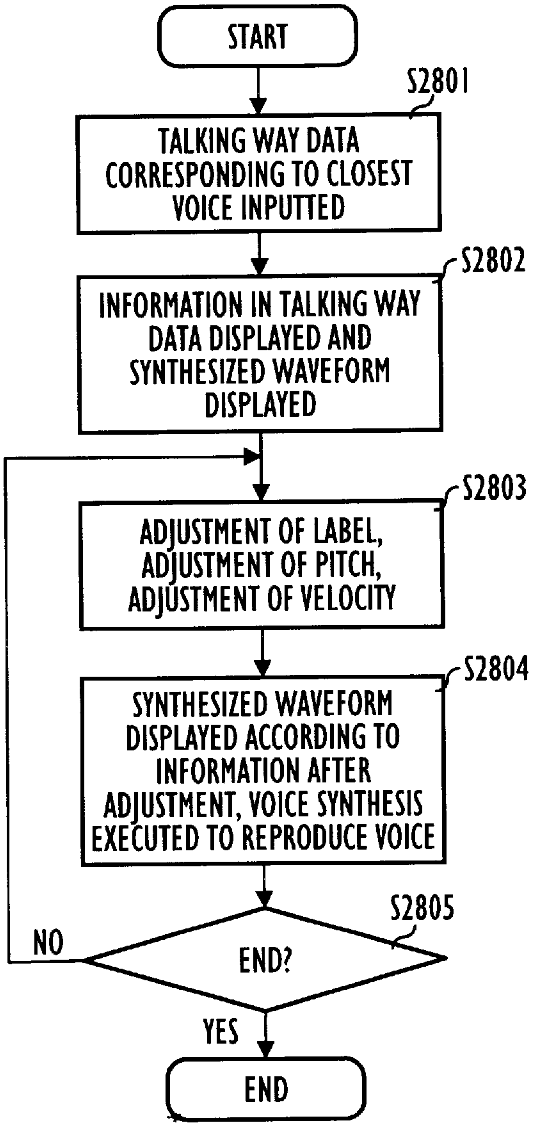
FIG. 28 is a flow chart showing outline of the processing of changing information in talking way data according to Embodiment 2.

FIG. 28 is a general flow chart showing a sequence of the processing for changing information in talking way data in Embodiment 2. At first, the character string information 202, phoneme string information 203, duration length 204, pitch information 205, and velocity information 206 included in the talking way data 201 corresponding to the selected closest voice are read out from the talking way data storing section 103 (S2801).

Figure 29:
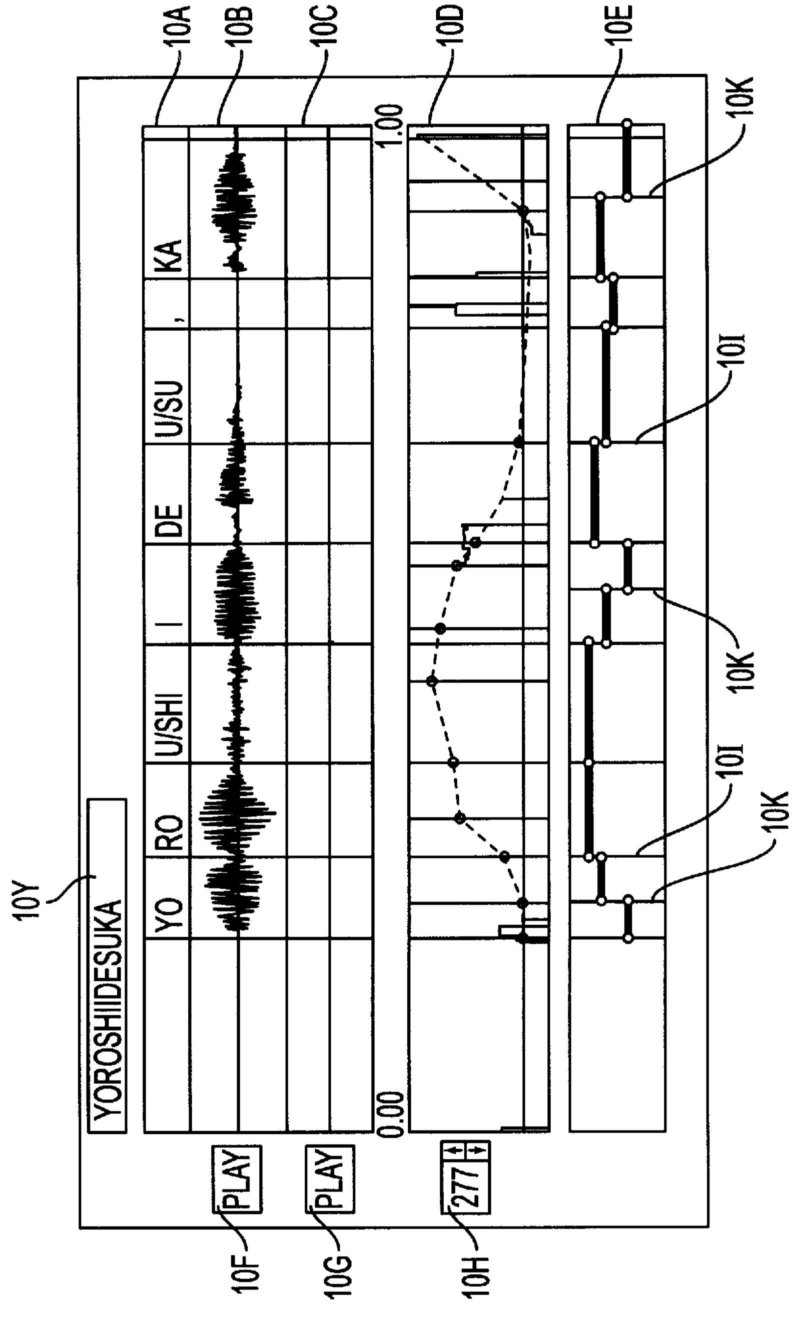
FIG. 29 is an explanatory view showing a display screen in the processing for changing information in talking way data according to Embodiment 2.

Then, as shown in FIG. 29, the character string information 202, phoneme string information 203, duration length 204, pitch information 205, and velocity information 206 read out in step S2801 are set (namely, displayed) in the character string input area 10Y, syllable display window 10A, visualized label, pitch display window 10D, and velocity display window 10E (S2802). Also, the waveform data synthesized from the talking way data 201 is displayed in the original waveform display window 10B then.

Then, on the display screen shown in FIG. 29, information in the talking way data 201 is changed by adjusting the visualized label, pitch or velocity (S2802). It should be noted that, in Embodiment 2, it is possible to specify or adjust the velocity information 206 in the talking way data 201 as a relative volume of the phoneme string information at an arbitrary point of time irrespective of a unit of the phoneme string information 203. Specifically, a volume (velocity information 206) can be adjusted by specifying, apart from the label 10I indicating the unit (separation) of the phoneme string information 203, the label 10K at an arbitrary position. With this feature, a talking way can be edited in further diversified ways.

Figure 30:
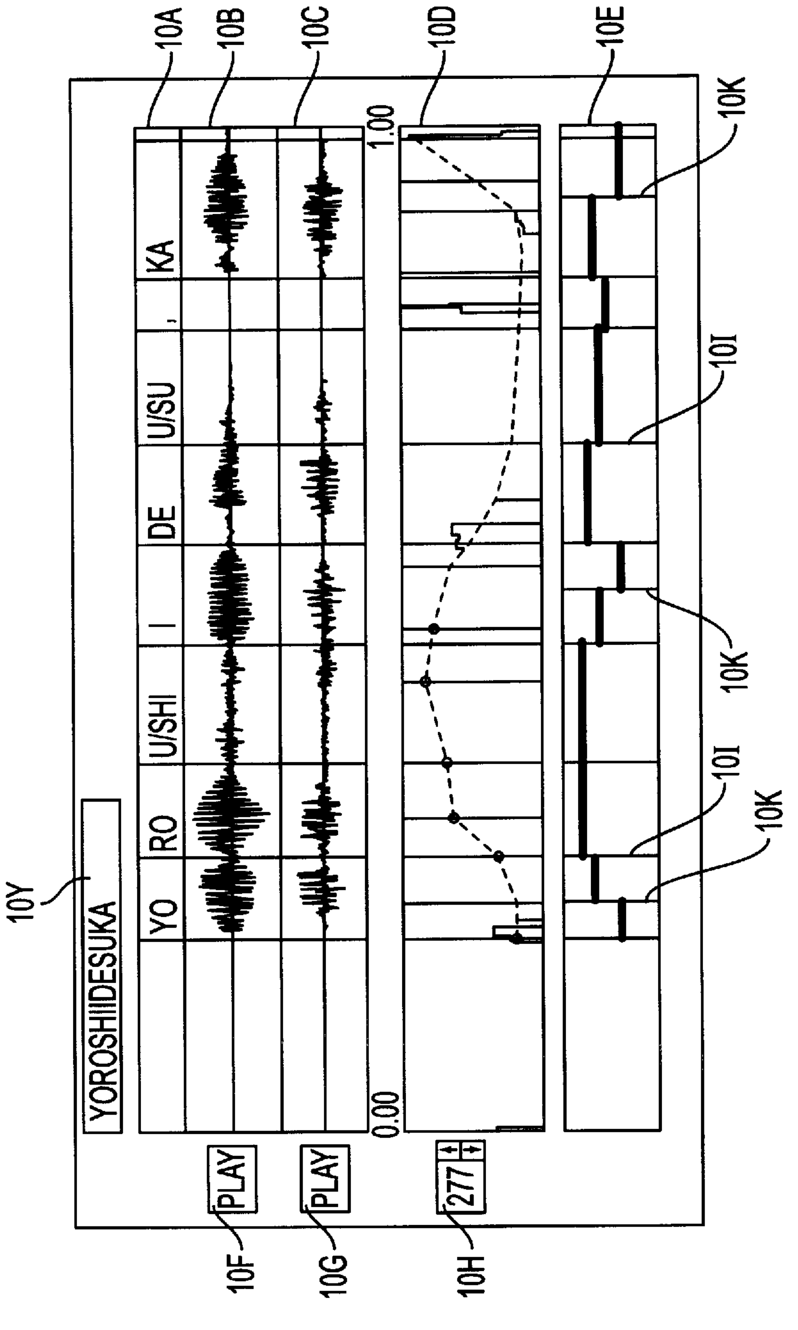
FIG. 30 is an explanatory view showing another example of a display screen in the processing for changing information in talking way data according to Embodiment 2.

Then, a synthesized waveform is generated according to information after adjustment, and for instance, as shown on the display screen in FIG. 30, the synthesized waveform data is displayed in the synthesized waveform display window 10C, and voice synthesis is executed to reproduce the voice (S2804). Although detailed description is not made herein, in step S2802, it is possible to compare the synthesized waveform data displayed in the synthesized waveform display window 10C to the waveform data synthesized from the original talking way data displayed in the original waveform display window 10B for reproduction of the voice.

Then, until the specified END key is pressed down, operations in steps S2803 to S2804 are repeated (S2805).

As described above, in second embodiment, information in any detailed section of the talking way data can be edited (namely, a label, pitch, or velocity can be adjusted) during preparation of a voice-generating document, so that the convenience can further be improved.

Also, the velocity information 206 in the talking way data 201 is information specifying a relative volume of the phoneme string information 203 at an arbitrary point of time, so that it becomes easier to prepare talking way data intended by a person who makes a document and also to prepare a talking way with further diversified expressions.

As explained above, a voice-generating document making apparatus according to the present invention comprises a talking way data storing means for storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a volume of each phoneme in the phoneme string information, for each group of talking way data having the same character string information according to character string information in the talking way data; a character string input means for inputting character strings each constituting a word, a clause, or a sentence; a retrieving means for retrieving groups each having the same character string information as the character string from the talking way storing means by using the character string inputted from the character string input means; a voice tone data storing means for storing therein a plurality of voice tone data each for adding a voice tone to a voice to be synthesized; a voice synthesizing means for successively reading out talking way data in the groups retrieved by the retrieving means and synthesizing a voice by using the phoneme string information, duration length, pitch information, and velocity information in the talking way data read out as well as one of voice tone data stored in the voice tone data storing means; a voice selecting means for selecting a desired voice from voices synthesized by the voice synthesizing means; and a voice-generating document storing means for storing therein the talking way data corresponding to the voice selected by the voice selecting means as a voice-generating document in correlation to the character string inputted from the character string input means; so that it is possible to prepare information (a voice-generating document) in which two types of expression forms, namely, character information and voice information are matched to each other in a consistent way. It is also possible to make information (a voice-generating document) having consistency with character information and voice information (talking way data) including a talking way intended by a person who makes a document, and to add non-language information such as emotional expressions and the like into a document. Furthermore, it is possible to precisely synthesize a voice in a way of talking intended by the person who makes a document.

A voice-generating document making apparatus according to the present invention comprises a talking way data storing means for storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a relative volume of the phoneme string information at an arbitrary point of time, for each group of talking way data having the same character string information according to character string information in the talking way data; a character string input means for inputting character strings each constituting a word, a clause, or a sentence; a retrieving means for retrieving groups each having the same character string information as the character string from the talking way storing means by using the character string inputted from the character string input means; a voice tone data storing means for storing therein a plurality of voice tone data each for adding a voice tone to a voice to be synthesized; a voice synthesizing means for successively reading out talking way data in the groups retrieved by the retrieving means and synthesizing a voice by using the phoneme string information, duration length, pitch information, and velocity information in the talking way data read out as well as one of voice tone data stored in the voice tone data storing means; a voice selecting means for selecting a desired voice from voices synthesized by the voice synthesizing means; and a voice-generating document storing means for storing therein the talking way data corresponding to the voice selected by the voice selecting means as a voice-generating document in correlation to the character string inputted from the character string input means; so that it is possible to prepare information (a voice-generating document) in which two types of expression forms, namely character information and voice information are matched to each other in a consistent way. It is also possible to make information (a voice-generating document) having consistency with character information and voice information (talking way data) including a talking way intended by a person who makes a document, and to add non-language information such as emotional expressions and the like into a document. Furthermore, it is possible to precisely synthesize a voice in a way of talking intended by the person who makes a document.

A voice-generating document making apparatus according to the present invention specifies reproduction of a voice-generating document and successively reads out talking way data in the voice-generating document to synthesize a voice; so that it is possible to easily confirm the voice-generating document.

A voice-generating document making apparatus according to the present invention can specify arbitrary units of character string, units of sentence, units of page in the voice-generating document, or the entire voice-generating document as an area in which the voice-generating document is to be reproduced; so that it is possible to easily reproduce and confirm the voice-generating document.

A voice-generating document making apparatus according to the present invention comprise a talking way data storing means for storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a volume of each phoneme in the phoneme string information, for each group of talking way data having the same character string information according to character string information in the talking way data; a character string input means for inputting character strings each constituting a word, a clause, or a sentence; a retrieving means for retrieving groups each having the same character string information as the character string from the talking way storing means by using the character string inputted from the character string input means; a voice tone data storing means for storing therein a plurality of voice tone data each for adding a voice tone to a voice to be synthesized; a voice tone data specifying means for specifying one of the voice tone data stored in the voice tone data storing means; a voice synthesizing means for successively reading out talking way data in the groups retrieved by the retrieving means and synthesizing a voice by using the phoneme string information, duration length, pitch information, and velocity information in the talking way data read out as well as voice tone data specified by the voice tone data specifying means; a voice selecting means for selecting a desired voice from voices synthesized by the voice synthesizing means; and a voice-generating document storing means for storing therein the talking way data and the voice tone data as a voice-generating document each corresponding to the voice selected by the voice selecting means in correlation to the character string inputted from the character string input means; so that it is possible to prepare information (a voice-generating document) in which two types of expression forms, namely character information and voice information are matched to each other in a consistent way. It is also possible to make information (a voice-generating document) having consistency with character information and voice information (intended by data) including a talking way intended by a person who makes a document, and to add non-language information such as emotional expressions and the like into a document. Furthermore, it is possible to precisely synthesize a voice in a way of talking intended by the person who makes a document.

A voice-generating document making apparatus according to the present invention comprises a talking way data storing means for storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a relative volume of the phoneme string information at an arbitrary point of time, for each group of talking way data having the same character string information according to character string information in the talking way data; a character string input means for inputting character strings each constituting a word, a clause, or a sentence; a retrieving means for retrieving groups each having the same character string information as the character string from the talking way storing means by using the character string inputted from the character string input means; a voice tone data storing means for storing therein a plurality of voice tone data each for adding a voice tone to a voice to be synthesized; a voice tone data specifying means for specifying one of the voice tone data stored in the voice tone data storing means; a voice synthesizing means for successively reading out talking way data in the groups retrieved by the retrieving means and synthesizing a voice by using the phoneme string information, duration length, pitch information, and velocity information in the talking way data read out as well as voice tone data specified by the voice tone data specifying means; a voice selecting means for selecting a desired voice from voices synthesized by the voice synthesizing means; and a voice-generating document storing means for storing therein the talking way data and the voice tone data as a voice-generating document each corresponding to the voice selected by the voice selecting means in correlation to the character string inputted from the character string input means; so that it is possible to prepare information (a voice-generating document) in which two types of expression forms, namely character information and voice information are matched to each other in a consistent way. It is also possible to make information (a voice-generating document) having consistency with character information and voice information (talking way data) including a talking way intended by a person who makes a document, and to add non-language information such as emotional expressions and the like into a document. Furthermore, it is possible to precisely synthesize a voice in a way of talking intended by the person who makes a document.

A voice-generating document making apparatus according to the present invention comprises a talking way data making/registering means for making talking way data and registering the information in the talking way data storing means; so that a person who makes a document can make and register desired talking way data, which makes it possible to enrich voice expressions (talking way) using a voice-generating document.

A voice-generating document making apparatus according to the present invention sets character string information, phoneme string information, duration length, pitch information, and velocity information for information in talking way data respectively to make talking way data and registers the information to a talking way data storing means; so that a person who makes a document can make and register desired talking way data, which makes it possible to enrich voice expressions (talking way) using a voice-generating document.

A voice-generating document making apparatus according to the present invention specifies regeneration of a voice-generating document and successively reads out talking way data in the voice-generating document to synthesize a voice; so that it is possible to confirm the voice-generating document easily.

A voice-generating document making apparatus according to the present invention can specify arbitrary units of character string, units of sentence, units of page in the voice-generating document, or the entire voice-generating document as an area in which the voice-generating document is to be regenerated; so that it is possible to regenerate and confirm the voice-generating document easily.

A voice-generating document making apparatus according to the present invention can display a voice-generating document stored in a voice-generating document storing means, specify an arbitrary character string of the displayed voice-generating document, and change or input again the specified character string by using a character string input means; and further it is possible to change talking way data and voice tone data corresponding to the specified character string by retrieving the information with a retrieving means, specifying voice tone data with a voice tone data specifying means, and synthesizing a voice with a voice synthesizing means as well as selecting a voice with a voice selecting means by using the changed or re-inputted character string; so that it is possible to extend an area in which the voice-generating document is to be used and improve convenience of the document.

A voice-generating document making apparatus according to the present invention has a plurality of voice tone data each of which can be identified respectively through a human sense such as a male's voice, a female's voice, a child's voice, an old person's voice, a husky voice, a clear voice, a deep voice, a thin voice, a strong voice, a gentle voice, and a mechanical voice; whereby it is possible to extend an area in which the voice-generating document is to be used and improve convenience of the document. In addition, it is also possible to synthesize a voice with further variety of voice tones.

A voice-generating document making apparatus according to the present invention has a kana (Japanese character)—kanji (Chinese character) converting function, and it is possible to use a text with kanji and kana mixed therein after a character string inputted by the character string input means is converted by using the kana-kanji converting function; so that it is possible to extend an area in which the voice-generating document is to be used and improve convenience of the document. In addition, it is also possible to obtain document expressions with higher flexibility.

With a voice-generating document making apparatus according to the present invention, talking way data has type information indicating classified types of talking way data respectively in addition to character string information, phoneme string information, duration length, pitch information and velocity information; when a classified type is specified, talking way data which is a group having the same character string information as the inputted character string and has the same type information as the specified classified type is retrieved from a talking way data storing means; and the retrieved talking way data is read out, and a voice is synthesized by using phoneme string information, a duration length, pitch information and velocity information in the read out talking way data as well as voice tone data specified by a voice tone data specifying means; so that it is possible to improve efficiency and convenience in making a voice-generating document.

A voice-generating document making apparatus according to the present invention classifies voices each corresponding to talking way data respectively into classified types according to pronunciation types each specific to a particular area such as Tokyo, Osaka, or Tokushima; so that it is possible to easily make a voice-generating document, which makes it possible to synthesize a voice according to a talking way based on a pronunciation specific to a particular area by specifying a classified type.

A voice-generating document making apparatus according to the present invention classifies voices each corresponding to talking way data respectively into classified types according to pronunciation types each specific to a particular age such as, an old person, a young person, or a high school student; so that it is possible to easily make a voice-generating document easily, which makes it possible to synthesize a voice according to a talking way based on a pronunciation specific to a particular age by specifying a classified type.

With a voice-generating document making apparatus according to the present invention, a character string input means has a display section, changes a font or a decorative method of a character string to be displayed, and displays the character string on the display section according to voice tone data specified for each character string of a voice-generating document; whereby it is possible to easily execute processing such as making/changing of a voice-generating document as well as to easily grasp the state of specifying voice tone data, which improves convenience of the voice-generating document.

A voice-generating document making method according to the present invention comprises a first step of inputting character strings each constituting a word, a clause, or a sentence; a second step of retrieving a group having the same character string information as the character string inputted in the first step by consulting a database storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a volume of each phoneme in the phoneme string information, for each group of talking way data having the same character string information according to character string information in the talking way data; a third step of specifying voice tone data for adding a voice tone to a voice to be synthesized; a fourth step of successively reading out talking way data in the groups retrieved in the second step and synthesizing a voice by using the phoneme string information, a duration length, pitch information, and velocity information in the talking way data read out as well as voice tone data specified in the third step; a fifth step of selecting a desired voice from voices synthesized in the fourth step; and a sixth step of storing therein the talking way data corresponding to the voice selected in the fifth step as a voice-generating document in correlation to the character string inputted in the first step; so that it is possible to prepare information (a voice-generating document) in which two types of expression forms, namely, character information and voice information are matched to each other in a consistent way. It is also possible to make information (a voice-generating document) having consistency with character information and voice information (talking way data) including a talking way intended by a person who makes a document, and to add non-language information such as emotional expressions and the like into a document. Furthermore, it is possible to precisely synthesize a voice in a way of talking intended by the person who makes a document.

A voice-generating document making method according to the present invention comprises a first step of inputting character strings each constituting a word, a clause, or a sentence; a second step of retrieving a group having the same character string information as the character string inputted in the first step by consulting a database storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a relative volume of the phoneme string information at an arbitrary point of time, for each group of talking way data having the same character string information according to character string information in the talking way data; a third step of specifying voice tone data for adding a voice tone to a voice to be synthesized; a fourth step of successively reading out talking way data in the groups retrieved in the second step and synthesizing a voice by using the phoneme string information, a duration length, and pitch information and velocity information in the talking way data read out as well as voice tone data specified in the third step; a fifth step of selecting a desired voice from voices synthesized in the fourth step; and a sixth step of storing therein the talking way data as a voice-generating document corresponding to the voice selected in the fifth step in correlation to the character string inputted in the first step; so that it is possible to prepare information (a voice-generating document) in which two types of expression forms, namely, character information and voice information are matched to each other in a consistent way. It is also possible to make information (a voice-generating document) having consistency with character information and voice information (talking way data) including a talking way intended by a person who makes a document, and to add non-language information such as emotional expressions and the like into a document. Furthermore, it is possible to precisely synthesize a voice in a way of talking intended by the person who makes a document.

A voice-generating document making method according to the present invention comprises a seventh step of specifying reproduction of a voice-generating document stored in the sixth step; and an eighth step of successively reading out talking way data and voice tone data in the voice-generating document when reproduction of the voice-generating document is specified and synthesizing a voice; whereby it is possible to easily confirm the voice-generating document.

With a voice-generating document making method according to the present invention, in the seventh step, arbitrary units of character string, units of sentence, units of page in a voice-generating document, or the entire voice-generating document can be specified as an area in which the voice-generating document is to be regenerated; whereby it is possible to easily reproduce and confirm the voice-generating document.

A voice-generating document making method according to the present invention comprises a ninth step of displaying a voice-generating document stored in the sixth step, specifying an arbitrary character string of the displayed voice-generating document, and changing or inputting again the specified character string; wherein the voice-generating document can be changed by executing again the second step, third step, fourth step, fifth step, and sixth step with the character string changed or re-inputted in the ninth step; so that it is possible to extend an area in which the voice-generating document is to be used and improve convenience of the document.

A computer-readable medium from which a computer can read out a program enabling execution by the program of a sequence for making a voice-generating document used in the computer-readable medium has program comprising a first sequence of inputting character strings each constituting a word, a clause, or a sentence; a second sequence of retrieving a group having the same character string information as the character string inputted in the first sequence by referring to a database storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a volume of each phoneme in the phoneme string information, for each group of talking way data having the same character string information according to character string information in the talking way data; a third sequence of specifying voice tone data for adding a voice tone to a voice to be synthesized; a fourth sequence of successively reading out talking way data in the groups retrieved in the second sequence and synthesizing a voice by using the phoneme string information, duration length, pitch information, and velocity information in the talking way data read out as well as voice tone data specified in the third sequence; a fifth sequence of selecting a desired voice from voices synthesized in the fourth sequence; and a sixth sequence of storing therein the talking way data corresponding to the voice selected in the fifth sequence as a voice-generating document in correlation to the character string inputted in the first sequence; so that it is possible to make information (a voice-generating document) having consistency with character information and voice information (talking way data) including data for a talking way intended by a person who makes a document. Also, it is possible to make information (a voice-generating document) having consistency with character information and voice information (talking way data) including data for a talking way intended by a person who makes a document and add non-language information such as emotional expressions and the like into a document. Furthermore, it is possible to precisely synthesize a voice in a way of talking intended by the person who makes a document.

A computer-readable medium from which a computer can read out a program enabling execution by the program of a sequence for making voice-generating document used in the computer-readable medium has a program comprising a first sequence of inputting character strings each constituting a word, a clause, or a sentence; a second sequence of retrieving a group having the same character string information as the character string inputted in the first sequence by referring to a database storing therein talking way data comprising character string information consisting of words, clauses, or sentences; phoneme string information consisting of phonemes each corresponding to a character in the character string information; a length of duration of each phoneme in the phoneme string information; pitch information for specifying a relative pitch of the phoneme string information at an arbitrary point of time; and velocity information for specifying a relative volume of the phoneme string information at an arbitrary point of time, for each group of talking way data having the same character string information according to character string information in the talking way data; a third sequence of specifying voice tone data for adding a voice tone to a voice to be synthesized; a fourth sequence of successively reading out talking way data in the groups retrieved in the second sequence and synthesizing a voice by using the phoneme string information, duration length, pitch information, and velocity information in the talking way data read out as well as voice tone data specified in the third sequence; a fifth sequence of selecting a desired voice from voices synthesized in the fourth sequence; and a sixth sequence of storing therein the talking way data as a voice-generating document corresponding to the voice selected in the fifth sequence in correlation to the character string inputted in the first sequence; so that it is possible to make information (a voice-generating document) having consistency with character information and voice information (talking way data) including data for a talking way intended by a person who makes a document. Also it is possible to make information (a voice-generating document) having consistency with character information and voice information (talking way data) including data for a talking way intended by a person who makes a document and add non-language information such as emotional expressions and the like into a document. Furthermore, it is possible to precisely synthesize a voice in a way of talking intended by the person who makes a document.

A computer-readable medium from which a computer can read out a program enabling execution by the program of a sequence for making voice-generating document used in the computer-readable medium stores therein a program comprising a seventh sequence of specifying reproduction of the voice-generating document stored in the sixth sequence; and an eighth sequence of successively reading out talking way data and voice tone data in the voice-generating document when reproduction of the voice-generating document is specified, and synthesizing a voice; so that it is possible to easily confirm the voice-generating document.

With a computer-readable medium from which a computer can read out a program enabling execution by the program of a sequence for making voice-generating document used in the computer-readable medium, in the seventh sequence, arbitrary units of character string, units of sentence, and units of page in the voice-generating document, or the entire voice-generating document can be specified as an area in which the voice-generating document is to be reproduced; so that it is possible to easily reproduce and confirm the voice-generating document.

A computer-readable medium from which a computer can read out a program enabling execution by the program of a sequence for making voice-generating document used in the computer-readable medium stores therein a program comprising a ninth sequence of displaying the voice-generating document stored in the sixth sequence, specifying an arbitrary character string of the displayed voice-generating document, and changing or inputting again the specified character string; wherein the voice-generating document can be changed by executing again the second sequence, third sequence, fourth sequence, fifth sequence, and sixth sequence with the character string changed or re-inputted in said ninth sequence; so that it is possible to extend an area in which the voice-generating document is to be used and improve convenience of the document.

This application is based on Japanese patent application No. HEI 8-324459 filed in the Japanese Patent Office on Dec. 4, 1996, the entire contents of which are hereby incorporated by reference.

It should be recognized that the sequence of steps, that comprise the processing for preparing a voice-generating document or are otherwise related thereto, as illustrated in flow charts or otherwise described in the specification, may be stored, in whole or in part, for any finite duration within computer-readable media. Such media may comprise, for example, but without limitation, a RAM, hard disk, floppy disc, ROM, including CD ROM, and memory of various types as now known or hereinafter developed. Such media also may comprise buffers, registers and transmission media, alone or as part of an entire communication network, such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A voice-generating document making apparatus comprising:

a talking way data storing means for storing therein talking way data comprising character string information comprising words, clauses, or sentences; phoneme string information comprising of phonemes each corresponding to a character in said character string information; a length of duration of each phoneme in said phoneme string information; pitch information for specifying a relative pitch of said phoneme string information at an arbitrary point of time; and velocity information for specifying a volume of each phoneme in said phoneme string information for each group of talking way data having the same character string information according to character string information in said talking way information;

a character string input means for inputting character strings each comprising one of a word, a clause, or a sentence;

a retrieving means for retrieving groups, each having the same character string information as said character string from said talking way storing means, by using a character string inputted from said character string input means;

a voice tone data storing means for storing therein a plurality of voice tone data each for adding a voice tone to a voice to be synthesized;

a voice synthesizing means for successively reading out talking way data in the groups retrieved by said retrieving means and synthesizing a voice by using the phoneme string information, duration length, pitch information, and velocity information in the talking way data read out as well as one of said plurality of voice tone data stored in said voice tone data storing means;

a voice selecting means for selecting a desired voice from voices synthesized by said voice synthesizing means; and a voice-generating document storing means for storing therein the talking way data corresponding to the voice selected by said voice selecting means as a voice-generating document in correlation to the character string inputted from said character string input means.

2. A voice-generating document making apparatus according to claim 1 further comprising:

a regeneration specifying means for specifying regeneration of the voice-generating document stored in said voice-generating document storing means; wherein, when regeneration of said voice-generating document is specified, said voice synthesizing means successively reads out talking way data in said voice-generating document to synthesize a voice.

3. A voice-generating document making apparatus according to claim 2, wherein said regeneration specifying means is operative to specify arbitrary units of character string, units of sentence, units of page in said voice-generating document, or the entire voice-generating document as an area in which said voice-generating document is to be regenerated.

4. A voice-generating document making apparatus according to claim 1, wherein said plurality of voice tone data comprises voice tone data each of which can be identified respectively through a human sense and comprises at least one of a male's voice, a female's voice, a child's voice, an old person's voice, a husky voice, a clear voice, a deep voice, a thin voice, a strong voice, a gentle voice, and a mechanical voice.

5. A voice-generating document making apparatus according to claim 1, wherein said character string input means has a kana (Japanese character)—kanji (Chinese character) converting function, and a character string inputted by said character string input means is a text with kanji and kana mixed therein having been converted by using said kana-kanji converting function.

6. A voice-generating document making apparatus comprising:

a talking way data storing means for storing therein talking way data comprising character string information comprising words, clauses, or sentences; phoneme string information comprising phonemes each corresponding to a character in said character string information; a length of duration of each phoneme in said phoneme string information; pitch information for specifying a relative pitch of said phoneme string information at an arbitrary point of time; and velocity information for specifying a relative volume of said phoneme string information at an arbitrary point of time for each group of talking way data having the same character string information according to character string information in said talking way data;

a character string input means for inputting character strings each comprising one of a word, a clause, or a sentence;

a retrieving means for retrieving groups, each having the same character string information as said character string from said talking way data storing means, by using a character string inputted from said character string input means;

a voice tone data storing means for storing therein a plurality of voice tone data each for adding a voice tone to a voice to be synthesized;

a voice synthesizing means for successively reading out talking way data in the groups retrieved by said retrieving means and synthesizing a voice by using the phoneme string information, duration length, and pitch information and velocity information in the talking way data read out as well as one of said plurality of voice tone data stored in said voice tone data storing means;

a voice selecting means for selecting a desired voice from voices synthesized by said voice synthesizing means; and a voice-generating document storing means for storing therein the talking way data corresponding to the voice selected by said voice selecting means as a voice-generating document as a voice-generating document in correlation to the character string inputted from said character string input means.

7. A voice-generating document making apparatus according to claim 6 further comprising:

a regeneration specifying means for specifying regeneration of the voice-generating document stored in said voice-generating document storing means; wherein, when regeneration of said voice-generating document is specified, said voice synthesizing means successively reads out talking way data in said voice-generating document to synthesize a voice.

8. A voice-generating document making apparatus according to claim 7, wherein said regeneration specifying means is operative to specify arbitrary units of character string, units of sentence, units of page in said voice-generating document, or the entire voice-generating document as an area in which said voice-generating document is to be regenerated.

9. A voice-generating document making apparatus according to claim 6, wherein said plurality of voice tone data comprises voice tone data each of which can be identified respectively through a human sense and comprises at least one of a male's voice, a female's voice, a child's voice, an old person's voice, a husky voice, a clear voice, a deep voice, a thin voice, a strong voice, a gentle voice, and a mechanical voice.

10. A voice-generating document making apparatus according to claim 6, wherein said character string input means has a kana (Japanese character)—kanji (Chinese character) converting function, and a character string inputted by said character string input means is a text with kanji and kana mixed therein having been converted by using said kana-kanji converting function.

11. A voice-generating document making apparatus comprising:

a talking way data storing means for storing therein talking way data comprising character string information comprising words, clauses, or sentences; phoneme string information comprising of phonemes each corresponding to a character in said character string information; a length of duration of each phoneme in said phoneme string information, pitch information for specifying a relative pitch of said phoneme string information at an arbitrary point of time; and velocity information for specifying a volume of each phoneme in said phoneme string information for each group of talking way data having the same character string information according to character string information in said talking way data;

a character string input means for inputting character strings each comprising one of a word, a clause, or a sentence;

a retrieving means for retrieving groups, each having the same character string information as said character string from said talking way data storing means, by using a character string inputted from said character string input means;

a voice tone data storing means for storing therein a plurality of voice tone data each for adding a voice tone to a voice to be synthesized;

a voice tone data specifying means for specifying one of the voice tone data stored in said voice tone data storing means;

a voice synthesizing means for successively reading out talking way data in the groups retrieved by said retrieving means and synthesizing a voice by using the phoneme string information, duration length, and pitch information and velocity information in the talking way data read out as well as voice tone data specified by said voice tone data specifying means;

a voice selecting means for selecting a desired voice from voices synthesized by said voice synthesizing means; and a voice-generating document storing means for storing therein the talking way data and the voice tone data as a voice-generating document each corresponding to the voice selected by said voice selecting means in correlation to the character string inputted from said character string input means.

12. A voice-generating document making apparatus according to claim 11 further comprising:

a talking way data making/registering means for making said talking way data and registering the information in said talking way data storing means.

13. A voice-generating document making apparatus according to claim 12, wherein said talking way data making/registering means comprises:

a voice waveform data input means for receiving voice waveform data previously recorded or a natural voice pronounced by a user, and displaying the voice waveform data;

a duration length setting means for analyzing phonemes each obtained by receiving the voice from the user or of said voice waveform data and setting a duration length of each phoneme for displaying it;

a phoneme string information adding means for adding phoneme string information corresponding to said set duration length;

a pitch curve displaying means for analyzing a pitch of said voice waveform data and displaying a pitch curve;

a pitch information generating means for generating pitch information by adjusting or adding thereto a relative pitch value of said phoneme string information at an arbitrary point of time according to said displayed pitch curve and phoneme string information;

a velocity information generating means for adjusting a volume of each phoneme in said phoneme string information and generating velocity information;

a character string information setting means for receiving a character string corresponding to said voice waveform data and setting character string information; and a registering means for registering said character string information, phoneme string information, duration length, and pitch information and velocity information as talking way data in appropriate groups in said talking way data storing means according to said character string information.

14. A voice-generating document making apparatus according to claim 11 further comprising:

a regeneration specifying means for specifying regeneration of the voice-generating document stored in said voice-generating document storing means; wherein, when regeneration of said voice-generating document is specified, said voice synthesizing means successively reads out talking way data as well as voice tone data in said voice-generating document for synthesizing a voice.

15. A voice-generating document making apparatus according to claim 14, wherein said regeneration specifying means is operative to specify arbitrary units of character string, units of sentence, units of page in said voice-generating document, or the entire voice-generating document as an area in which said voice-generating document is to be regenerated.

16. A voice-generating document making apparatus according to claim 11, wherein said apparatus comprises a display means to display the voice-generating document stored in said voice-generating document storing means, specify an arbitrary character string of said displayed voice-generating document, and change or input again said specified character string by using said character string input means; and further, wherein said apparatus comprises means to change talking way data and voice tone data corresponding to said specified character string by retrieving the information with said retrieving means, specifying voice tone data with said voice tone data specifying means, and synthesizing a voice with said voice synthesizing means as well as selecting a voice with said voice selecting means by using said changed or re-inputted character string.

17. A voice-generating document making apparatus according to claim 11, wherein said plurality of voice tone data comprises voice tone data each of which can be identified respectively through a human sense and comprises at least one of a male's voice, a female's voice, a child's voice, an old person's voice, a husky voice, a clear voice, a deep voice, a thin voice, a strong voice, a gentle voice, and a mechanical voice.

18. A voice-generating document making apparatus according to claim 11, wherein said character string input means has a kana (Japanese character)—kanji (Chinese character) converting function, and a character string inputted by said character string input means is a text with kanji and kana mixed therein having been converted by using said kana-kanji converting function.

19. A voice-generating document making apparatus according to claim 11 further comprising:

a classified type specifying means for specifying a classified type of said talking way data;

wherein said talking way data has type information indicating classified types of talking way data respectively in addition to said character string information, phoneme string information, duration length, and pitch information and velocity information;

said retrieving means retrieves talking way data which is a group having the same character string information as said character string and has the same type information as said specified classified type from said talking way data storing means by using the character string inputted by said character string input means as well as the classified type specified by said classified type specifying means, when a classified type is specified through said classified type specifying means; and said voice synthesizing means reads out talking way data retrieved by said retrieving means and synthesizes a voice by using phoneme string information, a duration length, pitch information, and velocity information in said read out talking way data as well as voice tone data specified by said voice tone data specifying means.

20. A voice-generating document making apparatus according to claim 19, wherein said classified types indicate types in which voices, each corresponding to talking way data, respectively, are classified according to pronunciation types each specific to a particular geographic area.

21. A voice-generating document making apparatus according to claim 19, wherein said classified types indicate types in which voices, each corresponding to talking way data, respectively, are classified according to pronunciation types each specific to a person's age group.

22. A voice-generating document making apparatus according to claim 11, wherein said character string input means comprises a display section which is operative to change a font or a decorative method of a character string to be displayed, and is operative to display the character string on said display section according to voice tone data specified for each character string of said voice-generating document.

23. A voice-generating document making apparatus comprising: a talking way data storing means for storing therein talking way data comprising character string information consisting of words, clauses, or sentences; phoneme string information comprising phonemes each corresponding to a character in said character string information; a length of duration of each phoneme in said phoneme string information; pitch information for specifying a relative pitch of said phoneme string information at an arbitrary point of time; and velocity information for specifying a relative volume of said phoneme string information at an arbitrary point of time for each group of talking way data having the same character string information according to character string information in said talking way data;

a character string input means for inputting character strings each comprising one of a word, a clause, or a sentence;

a retrieving means for retrieving groups, each having the same character string information as said character string from said talking way data storing means, by using a character string inputted from said character string input means;

a voice tone data storing means for storing therein a plurality of voice tone data each for adding a voice tone to a voice to be synthesized;

a voice tone data specifying means for specifying one of the voice tone data stored in said voice tone data storing means;

a voice synthesizing means for successively reading out talking way data in the groups retrieved by said retrieving means and synthesizing a voice by using the phoneme string information, duration length, and pitch information and velocity information in the talking way data read out as well as voice tone data specified by said voice tone data specifying means;

a voice selecting means for selecting a desired voice from voices synthesized by said voice synthesizing means; and a voice-generating document storing means for storing therein the talking way data and the voice tone data as a voice-generating document each corresponding to the voice selected by said voice selecting means in correlation to the character string inputted from said character string input means.

24. A voice-generating document making apparatus according to claim 23 further comprising:

a talking way data making/registering means for making said talking way data and registering the information in said talking way data storing means.

25. A voice-generating document making apparatus according to claim 24, wherein said talking way data making/registering means comprises:

a voice waveform data input means for receiving voice waveform data previously recorded or a natural voice pronounced by a user, and displaying the voice waveform data;

a duration length setting means for analyzing phonemes each obtained by receiving the voice from the user or of said voice waveform data and setting a duration length of each phoneme for displaying it;

a phoneme string information adding means for adding phoneme string information corresponding to said set duration length;

a pitch curve displaying means for analyzing a pitch of said voice waveform data and displaying a pitch curve;

a pitch information generating means for generating pitch information by adjusting or adding thereto a relative pitch value of said phoneme string information at an arbitrary point of time according to said displayed pitch curve and phoneme string information;

a velocity information generating means for adjusting a volume of each phoneme in said phoneme string information and generating velocity information;

a character string information setting means for receiving a character string corresponding to said voice waveform data and setting character string information; and a registering means for registering said character string information, phoneme string information, duration length, and pitch information and velocity information as talking way data in appropriate groups in said talking way data storing means according to said character string information.

26. A voice-generating document making apparatus according to claim 23 further comprising:

a regeneration specifying means for specifying regeneration of the voice-generating document stored in said voice-generating document storing means; wherein, when regeneration of said voice-generating document is specified, said voice synthesizing means successively reads out talking way data as well as voice tone data in said voice-generating document for synthesizing a voice.

27. A voice-generating document making apparatus according to claim 26, wherein said regeneration specifying means can specify arbitrary units of character string, units of sentence, units of page in said voice-generating document, or the entire voice-generating document as an area in which said voice-generating document is to be regenerated.

28. A voice-generating document making apparatus according to claim 23, wherein said apparatus comprises a display means to display the voice-generating document stored in said voice-generating document storing means, specify an arbitrary character string of said displayed voice-generating document, and change or input again said specified character string by using said character string input means; and further, wherein said apparatus comprises means to change talking way data and voice tone data corresponding to said specified character string by retrieving the information with said retrieving means, specifying voice tone data with said voice tone data specifying means, and synthesizing a voice with said voice synthesizing means as well as selecting a voice with said voice selecting means by using said changed or re-inputted character string.

29. A voice-generating document making apparatus according to claim 23, wherein said pluralities of voice tone data are voice tone data each of which can be identified respectively through a human sense.

30. A voice-generating document making apparatus according to claim 23, wherein said character string input means has a kana (Japanese character)—kanji (Chinese character) converting function, and a character string inputted by said character string input means is a text with kanji and kana mixed therein having been converted by using said kana-kanji converting function.

31. A voice-generating document making apparatus according to claim 23 further comprising:

a classified type specifying means for specifying a classified type of said talking way data;

wherein said talking way data has type information indicating classified types of talking way data respectively in addition to said character string information, phoneme string information, duration length, and pitch information and velocity information;

said retrieving means retrieves talking way data which is a group having the same character string information as said character string and has the same type information as said specified classified type from said talking way data storing means by using the character string inputted by said character string input means as well as the classified type specified by said classified type specifying means, when a classified type is specified through said classified type specifying means; and said voice synthesizing means reads out talking way data retrieved by said retrieving means and synthesizes a voice by using phoneme string information, a duration length, pitch information, and velocity information in said read out talking way data as well as voice tone data specified by said voice tone data specifying means.

32. A voice-generating document making apparatus according to claim 31, wherein said classified types indicate types in which voices each corresponding to talking way data, respectively, are classified according to pronunciation types each specific to a particular geographic area.

33. A voice-generating document making apparatus according to claim 31, wherein said classified types indicate types in which voices each corresponding to talking way data, respectively, are classified according to pronunciation types each specific to a person's age group.

34. A voice-generating document making apparatus according to claim 23, wherein said character string input means comprises display section, change and is operative to a font or a decorative method of a character string to be displayed, and to display the character string on said display section according to voice tone data specified for each character string of said voice-generating document.

35. A voice-generating document making method comprising:

inputting character strings each constituting a word, a clause, or a sentence;

retrieving a group having the same character string information as the character string inputted in said inputting activity by consulting a database storing therein talking way data comprising character string information consisting of words, clauses, or sentences, phoneme string information consisting of phonemes each corresponding to a character in said character string information, a length of duration of each phoneme in said phoneme string information, pitch information for specifying a relative pitch of said phoneme string information at an arbitrary point of time, and velocity information for specifying a volume of each phoneme in said phoneme string information for each group of talking way data having the same character string information according to character string information in said talking way data;

specifying voice tone data for adding a voice tone to a voice to be synthesized;

successively reading out talking way data in the groups retrieved in said retrieving activity and synthesizing a voice by using the phoneme string information, a duration length, pitch information, and velocity information in the talking way data read out as well as voice tone data specified in said specifying activity;

selecting a desired voice from voices synthesized in said reading out activity; and storing the talking way data corresponding to the voice selected in said selecting activity as a voice-generating document in correlation to the character string inputted by said inputting activity.

36. A voice-generating document making method according to claim 35 further comprising:

specifying regeneration of the voice-generating document stored in said storing activity; and successively reading out talking way data and voice tone data in said voice-generating document when regeneration of said voice-generating document is specified and synthesizing a voice.

37. A voice-generating document making method according to claim 36, wherein, in said specifying regeneration activity, arbitrary units of character string, units of sentence, units of page in said voice-generating document, or the entire voice-generating document can be specified as an area in which said voice-generating document is to be regenerated.

38. A voice-generating document making method according to claim 35 further comprising:

displaying the voice-generating document stored in said storing activity, specifying an arbitrary character string of said displayed voice-generating document, and changing or inputting again said specified character string; wherein said voice-generating document can be changed by executing again said retrieving activity, voice specifying activity, reading out activity, voice selecting activity, and storing activity with the character string changed or re-inputted in said inputting again activity.

39. A voice-generating document making method comprising:

a first step of inputting character strings each constituting a word, a clause, or a sentence;

a second step of retrieving a group having the same character string information as the character string inputted in said first step by referring to a database storing therein talking way data comprising character string information consisting of words, clauses, or sentences, phoneme string information consisting of phonemes each corresponding to a character in said character string information, a length of duration of each phoneme in said phoneme string information, pitch information for specifying a relative pitch of said phoneme string information at an arbitrary point of time; and velocity information for specifying a relative volume of said phoneme string information at an arbitrary point of time for each group of talking way data having the same character string information according to character string information in said talking way data;

a third step of specifying voice tone data for adding a voice tone to a voice to be synthesized;

a fourth step of successively reading out talking way data in the groups retrieved in said second step and synthesizing a voice by using the phoneme string information, duration length, and pitch information and velocity information in the talking way data read out as well as voice tone data specified in said third step;

a fifth step of selecting a desired voice from voices synthesized in said fourth step; and a sixth step of storing therein the talking way data corresponding to the voice selected in said fifth step as a voice-generating document in correlation to the character string inputted in said first step.

40. A voice-generating document making method according to claim 39 further comprising:

a seventh step of specifying regeneration of the voice-generating document stored in said sixth step; and an eighth step of successively reading out talking way data and voice tone data in said voice-generating document when regeneration of said voice-generating document is specified and synthesizing a voice.

41. A voice-generating document making method according to claim 40, wherein, in said seventh step, arbitrary units of character string, units of sentence, units of page in said voice-generating document, or the entire voice-generating document can be specified as an area in which said voice-generating document is to be regenerated.

42. A voice-generating document making method according to claim 39 further comprising:

a ninth step of displaying the voice-generating document stored in said sixth step, specifying an arbitrary character string of said displayed voice-generating document, and changing or inputting again said specified character string; wherein said voice-generating document can be changed by executing again said second step, third step, fourth step, fifth step, and sixth step with the character string changed or re-inputted in said ninth step.

43. A computer-readable medium from which a computer can read out a program enabling execution by the program of a sequence for making a voice-generating document used in the computer-readable medium; wherein said storage medium stores therein a program comprising:

a first sequence for inputting character strings each constituting a word, a clause, or a sentence;

a second sequence for retrieving a group having the same character string information as the character string inputted in said first sequence by referring to a database storing therein talking way data comprising character string information consisting of words, clauses, or sentences, phoneme string information consisting of phonemes each corresponding to a character in said character string information, a length of duration of each phoneme in said phoneme string information, pitch information for specifying a relative pitch of said phoneme string information at an arbitrary point of time; and velocity information for specifying a volume of each phoneme in said phoneme string information for each group of talking way data having the same character string information according to character string information in said talking way data;

a third sequence for specifying voice tone data for adding a voice tone to a voice to be synthesized;

a fourth sequence for successively reading out talking way data in the groups retrieved in said second sequence and synthesizing a voice by using the phoneme string information, duration length, pitch information, and velocity information in the talking way data read out as well as voice tone data specified in said third sequence;

a fifth sequence for selecting a desired voice from voices synthesized in said fourth sequence; and a sixth sequence for storing therein the talking way data corresponding to the voice selected in said fifth sequence as a voice-generating document in correlation to the character string inputted in said first sequence.

44. A computer-readable medium from which a computer can read out a program enabling execution by the program of a sequence for making voice-generating documents used in the computer-readable medium according to claim 43; wherein said storage medium stores therein a program further comprising: a seventh sequence for specifying regeneration of the voice-generating document stored in said sixth sequence; and an eighth sequence for successively reading out talking way data and voice tone data in said voice-generating document when regeneration of said voice-generating document is specified, and synthesizing a voice.

45. A computer-readable medium from which a computer can read out a program enabling execution by the program of a sequence for making voice-generating documents used in the computer-readable medium according to claim 44; wherein, in said seventh sequence, arbitrary units of character string, units of sentence, units of page in said voice-generating document, or the entire voice-generating document can be specified as an area in which said voice-generating document is to be regenerated.

46. A computer-readable medium from which a computer can read out a program enabling execution by the program of a sequence for making voice-generating documents used in the computer-readable medium according to claim 43; wherein said storage medium stores therein a program further comprising:

a ninth sequence for displaying the voice-generating document stored in said sixth sequence, specifying an arbitrary character string of said displayed voice-generating document, and changing or inputting again said specified character string;

wherein said voice-generating document can be changed by executing again said second sequence, third sequence, fourth sequence, fifth sequence, and sixth sequence with the character string changed or re-inputted in said ninth sequence.

47. A computer-readable medium from which a computer can read out a program enabling execution by the program of a sequence for making voice-generating documents used in the storage medium; wherein said computer-readable medium stores therein a program comprising:

a first sequence for inputting character strings each constituting a word, a clause, or a sentence;

a second sequence for retrieving a group having the same character string information as the character string inputted in said first sequence by referring to a database storing therein talking way data comprising character string information consisting of words, clauses, or sentences, phoneme string information consisting of phonemes each corresponding to a character in said character string information, a length of duration of each phoneme in said phoneme string information, pitch information for specifying a relative pitch of said phoneme string information at an arbitrary point of time; and velocity information for specifying a relative volume of said phoneme string information at an arbitrary point of time for each group of talking way data having the same character string information according to character string information in said talking way data;

a third sequence for specifying voice tone data for adding a voice tone to a voice to be synthesized;

a fourth sequence for successively reading out talking way data in the groups retrieved in said second sequence and synthesizing a voice by using the phoneme string information, duration length, pitch information, and velocity information in the talking way data read out as well as voice tone data specified in said third sequence;

a fifth sequence for selecting a desired voice from voices synthesized in said fourth sequence; and a sixth sequence for storing therein the talking way data corresponding to the voice selected in said fifth sequence as a voice-generating document in correlation to the character string inputted in said first sequence.

48. A computer-readable medium from which a computer can read out a program enabling execution by the program of a sequence for making voice-generating documents used in the computer-readable medium according to claim 47; wherein said storage medium stores therein a program further comprising:

a seventh sequence for specifying regeneration of the voice-generating document stored in said sixth sequence; and an eighth sequence for successively reading out talking way data and voice tone data in said voice-generating document when regeneration of said voice-generating document is specified, and synthesizing a voice.

49. A computer-readable medium from which a computer can read out a program enabling execution by the program of a sequence for making voice-generating documents used in the computer-readable medium according to claim 48; wherein, in said seventh sequence, arbitrary units of character string, units of sentence, units of page in said voice-generating document, or the entire voice-generating document can be specified as an area in which said voice-generating document is to be regenerated.

50. A computer-readable medium from which a computer can read out a program enabling execution by the program of a sequence for making voice-generating documents used in the computer-readable medium according to claim 47; wherein said storage medium stores therein a program further comprising:

a ninth sequence for displaying the voice-generating document stored in said sixth sequence, specifying an arbitrary character string of said displayed voice-generating document, and changing or inputting again said specified character string;

wherein said voice-generating document can be changed by executing again said second sequence, third sequence, fourth sequence, fifth sequence, and sixth sequence with the character string changed or re-inputted in said ninth sequence.

51. A voice-generating document-making apparatus comprising:

a display means to display a voice-generating document stored in a memory, means for specifying an arbitrary character string of said displayed voice-generating document, said character string having corresponding talking way data and voice tone data stored in said memory;

means for changing said specified character string by changing said talking way data and voice tone data in cooperation with said display, said means for changing further comprising means individually for specifying voice tone data, duration length data, phoneme string data, pitch data and velocity information;

means for selecting a voice by using said changed character string; and means for synthesizing with data from said memory said selected voice.

52. A voice-generating document making apparatus according to claim 51 further comprising:

a classified type specifying means for specifying a classified type of said talking way data;

wherein said talking way data has type information indicating classified types of talking way data respectively in addition to said character string information, phoneme string information, duration length, and pitch information and velocity information;

retrieving means for retrieving talking way data which is a group having the same character string information as said character string and has the same type information as said specified classified type from said memory by using the character string inputted by said character string input means as well as the classified type specified by said classified type specifying means, when a classified type is specified through said classified type specifying means; and said voice synthesizing means reads out talking way data retrieved by said retrieving means and synthesizes a voice by using phoneme string information, a duration length, pitch information, and velocity information in said read out talking way data as well as voice tone data specified by said specifying means.

53. A voice-generating document-making apparatus comprising:

a display means to display a voice-generating document stored in a memory, means for specifying an arbitrary character string of said displayed voice-generating document, said character string having corresponding talking way data and voice tone data stored in said memory;

means for reinputting said specified character string for changing said talking way data and voice tone data in cooperation with said display, said means for reinputting further comprising means for individually specifying voice tone data, duration length data, phoneme string data, pitch data and velocity information;

means for selecting a voice by using said reinputted character string; and means for synthesizing said selected voice.

54. A voice-generating document making apparatus according to claim 53 further comprising:

a classified type specifying means for specifying a classified type of said talking way data;

wherein said talking way data has type information indicating classified types of talking way data respectively in addition to said character string information, phoneme string information, duration length, and pitch information and velocity information;

retrieving means for retrieving talking way data which is a group having the same character string information as said character string and has the same type information as said specified classified type from said memory by using the character string inputted by said character string input means as well as the classified type specified by said classified type specifying means, when a classified type is specified through said classified type specifying means; and said voice synthesizing means reads out talking way data retrieved by said retrieving means and synthesizes a voice by using phoneme string information, a duration length, pitch information, and velocity information in said read out talking way data as well as voice tone data specified by said specifying means.

* * * * *